(12) United States Patent
Cho

(10) Patent No.: US 7,659,953 B2
(45) Date of Patent: Feb. 9, 2010

(54) LIQUID CRYSTAL DISPLAY HAVING REFLECTING REGION

(75) Inventor: Sung Nae Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 11/944,820

(22) Filed: Nov. 26, 2007

(65) Prior Publication Data

US 2008/0170175 A1 Jul. 17, 2008

(30) Foreign Application Priority Data

Jan. 17, 2007 (KR) .................. 10-2007-0005436

(51) Int. Cl.
*G02F 1/1335* (2006.01)
(52) U.S. Cl. .................. 349/113; 349/106; 349/114; 349/155
(58) Field of Classification Search .............. 349/105, 349/106, 113, 114, 155
See application file for complete search history.

(56) References Cited

U.S. PATENT DOCUMENTS

| | | | | |
|---|---|---|---|---|
| 6,704,077 | B1* | 3/2004 | Yoshida et al. | 349/113 |
| 7,142,268 | B1* | 11/2006 | Lowe | 349/86 |
| 2004/0135944 | A1* | 7/2004 | Kim | 349/113 |
| 2008/0123034 | A1* | 5/2008 | Cho | 349/114 |

* cited by examiner

*Primary Examiner*—Dung Nguyen
*Assistant Examiner*—Tai Duong
(74) *Attorney, Agent, or Firm*—Sughrue Mion, PLLC

(57) ABSTRACT

A liquid crystal display (LCD) includes a rear substrate and a front substrate, an LC (liquid crystal) layer placed between the rear substrate and the front substrate, and a reflecting region which reflects external light in at least a portion of a region toward the LC layer at a side of the rear substrate to illuminate the LC layer, and the reflecting region includes an array of a plurality of reflecting surfaces which are formed so that at least a portion toward the front substrate of a side of the rear substrate is not parallel to the front substrate, a first medium layer having a first index of refraction and formed to have a flat surface on the reflecting surfaces, a second medium layer having a second index of refraction that is smaller than the first medium layer, and a third medium layer having a third index of refraction that is larger than the second medium layer, and a portion of light that travels from the rear substrate at an interface between the first medium layer and the second medium layer is totally internally reflected.

24 Claims, 21 Drawing Sheets

LIQUID CRYSTAL DISPLAY HAVING REFLECTING REGION

CROSS-REFERENCE TO RELATED PATENT APPLICATIONS

This application claims the benefit of Korean Patent Application No. 10-2007-0005436, filed on Jan. 17, 2007, in the Korean Intellectual Property Office, the disclosure of which is incorporated herein in its entirety by reference.

BACKGROUND OF THE INVENTION

1. Field of the Invention

The present invention relates to a liquid crystal display (LCD), and more particularly, to an LCD having a reflecting region which is formed inside a liquid crystal panel and in which external light can be reflected.

2. Description of the Related Art

A liquid crystal display (LCD) is a thin, flat display device made up of arrays of color or monochrome pixels. Due to its low power consumption, it has been most widely used as displays for battery powered electronic devices in which low power consumption plays a crucial role.

LCDs are categorized as either transmissive, reflective, or transreflective LCDs according to the location of a light source for illuminating liquid crystal (LC). In the transmissive LCDs, liquid crystals are illuminated by a backlight unit (BLU) that is located at the back of a panel.

This type of LCDs are used in applications such as flat panel displays, televisions, personal digital assistants (PDA) or mobile phones which that require high luminance levels.

One of major drawbacks of transmissive LCDs is in their dependence on BLU as an illuminating light source in which major power consumption occurs for the system.

In the reflective LCDs, external light is used as a lighting source for illuminating LCs in the device. The external light reflects off a reflector which is placed at the back of an LC layer. In the reflective LCDs, the absence of an active lighting source such as a BLU for transmissive LCDs significantly reduces the overall power consumption for the system, which mask the reflective LCDs attractive technology in applications such as digital watches and calculators to name a few where low power consumption is of crucial importance.

However, the reflective LCDs are not perfect. Since the reflective LCDs do not have their own built in lighting source such as BLU for illumination, they cannot be used in places that are not surrounded by external light sources, that is, places where there is no external light. In addition, since in the reflective LCDs, the light must pass through the LC layer twice, it suffers from a low contrast ratio compared to the transmissive LCD counterparts.

Many commercially available devices such as PDA or mobile phones in which both low power consumption and high image quality are of crucial importance, take advantages from both reflective and transmissive LCD technologies by combining the two into a single package, which technology is known as transreflective LCD. The transreflective LCDs work by switching modes between a reflective LCD and a transmissive LCD depending on the condition of an external ambient light source in an environment. During the daylight or in places where sufficient ambient light source is present, the reflective LCD mode gets activated, and during nights or in dark environments, the transmissive LCD mode gets enabled.

Although the transreflective LCD technology seems to be the perfect solution, for proper balancing between the need for lower power consumption and high image displaying quality, there are still much more required fine tunings. Since this technology merely combines the two previous versions, reflective and transmissive LCD technologies, the problems that were present in reflective and transmissive LCD technologies are present in transreflective LCD technology. One of the major shortcomings in devices utilizing transreflective LCD technology is poor contrast ratio performance of which trait can trace the reflective LCD technology portion.

This defect may be attributed to the following two processes:

1. The light must pass through the LC layer twice in the reflective LCD.
2. Only a small portion of the external light rays reflecting by the reflector contributes to illumination of the LC layer.

In the reflective LCD, since light must pass the LC layer twice, the latter of the two above-attributed defects can be improved.

Rays of a component which passes through the LC layer vertically after reflecting off the reflector substantially, contribute to illumination of the LC layer so as to show the excellent contrast ratio performance of rays reflecting off the reflector.

Thus, in order to improve contrast ratio performance, the amount of a component which passes through the LC layer vertically, needs to be increased so as to improve the ratio of rays reflecting off the reflector that substantially contributes to illumination of the LC layer.

SUMMARY OF THE INVENTION

The present invention provides a liquid crystal display (LCD) having a reflecting region having an improved structure which is formed inside a liquid crystal (LC) panel and in which the ratio of the vertical component of light that is incident on the LC panel from the outside and reflects off the reflection region can be increased.

According to an aspect of the present invention, there is provided an LCD (liquid crystal display) comprising: a rear substrate and a front substrate; an LC (liquid crystal) layer placed between the rear substrate and the front substrate; and a reflecting region which reflects external light in at least a portion of a region toward the LC layer at a side of the rear substrate to illuminate the LC layer; and the reflecting region comprises: an array of a plurality of reflecting surfaces which are formed so that at least a portion toward the front substrate of a side of the rear substrate is not parallel to the front substrate; a first medium layer having a first index of refraction and formed to have a flat surface on the reflecting surfaces; a second medium layer having a second index of refraction that is smaller than the first medium layer; and a third medium layer having a third index of refraction that is larger than the second medium layer, and a portion of light that travels from the rear substrate at an interface between the first medium layer and the second medium layer is total internally reflected.

The reflecting surfaces may be concave reflecting curved surfaces.

The LCD may further comprise a scatterer placed inside the first medium layer to be separated from the concave reflecting surfaces toward the front substrate, and the first medium layer fixes the scatterer on the concave reflecting curved surfaces.

A cross-section of the concave reflecting curved surfaces may form a parabola, and the scatterer may be placed at a focus of the concave reflecting curved surfaces or near the focus.

The scatterer may be one selected from the group consisting of a single spherical scatterer, a core-shell structure spherical scatterer, and a scatterer having an effective spherical structure in which scattering particles form a cluster.

The scattering particles may be one of core-shell structure spherical scattering particles or spherical scattering particles.

The scatterer may be disposed to scatter a plurality types of color light or particular single color light.

The LCD may further comprise: a BLU (backlight unit) located at the back of the rear substrate; and a transmissive region through which illumination light from the BLU passes toward the LC layer.

The LCD may further comprise a color filter disposed on the front substrate, wherein the scatterer is disposed to scatter a plurality of types of color light.

The scatterer may be disposed to scatter particular color light, the reflecting region may serve as an effective color filter element for particular color light, and a color filter element for passing the same color light as the particular color light may be further provided in a position corresponding to the transmissive region.

The LCD may be a reflective LCD.

The LCD may further comprise a color filter disposed on the front substrate, wherein the scatterer is disposed to scatter a plurality of types of color light.

The scatterer may be disposed to scatter particular color light, and the reflecting region may serve as an effective color filter element for particular color light so that a color filter is not needed.

A cross-section of the concave reflecting curved surfaces may form a parabola.

The reflecting surfaces may be convex reflecting curved surfaces.

A cross-section of the convex reflecting curved surfaces may form a parabola.

The LCD may further comprise a reflecting block which is disposed in a boundary pixel or a subpixel to prevent light total internally reflected at an interface between the first and second medium layers from traveling an adjacent pixel or subpixel, by reflection.

The first and third medium layers may be formed of a transparent dielectric material, and the second medium layer may be formed of a vacuum or air gap.

The array of reflecting surfaces may be formed of metal.

The LCD may further comprise spacers supporting the third medium layer with respect to the first medium layer inside the second medium layer The reflecting surfaces may be regularly arranged to be spaced apart from one another not to contact one another or to contact one another, and the spacers may be positioned in any one shape of entire region between the reflecting surfaces, entire region between partial reflecting surfaces, and a portion of a region between at least a portion of reflecting surfaces.

The reflecting surfaces may be irregularly arranged to contact and/or to be spaced apart from one another, and the spacers may be positioned in any one shape of entire region between the reflecting surfaces, entire region between partial reflecting surfaces, and a portion of a region between at least a portion of reflecting surfaces.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
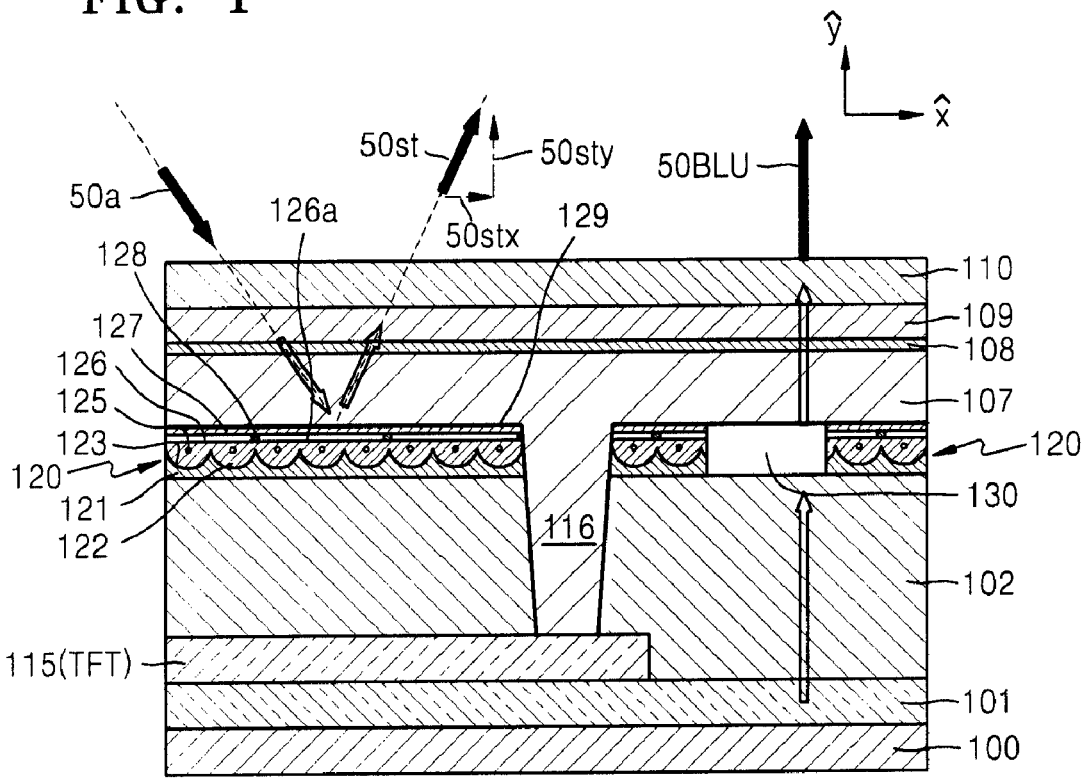
FIG. 1 illustrates a transreflective liquid crystal display (LCD) which is a type of LCD according to an embodiment of the present invention.
Figure 2:
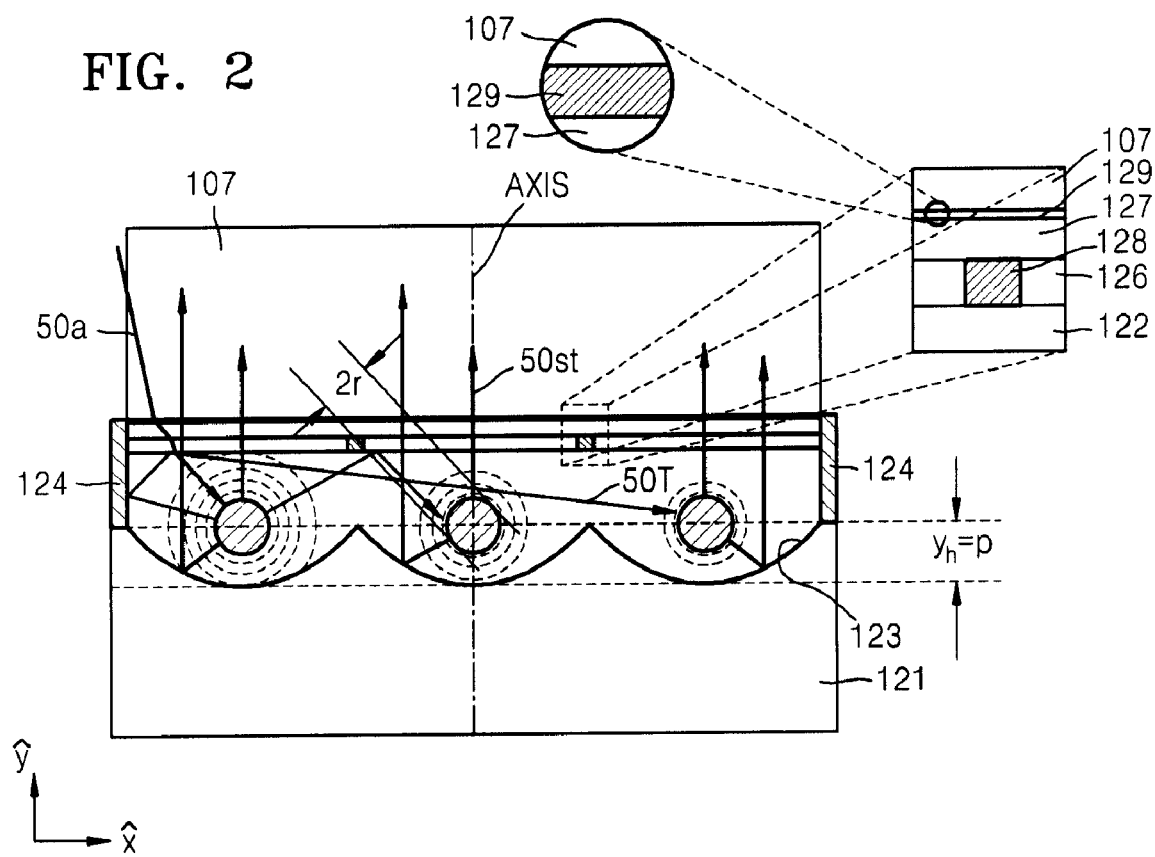
FIG. 2 is an enlarged view of a reflecting region of FIG. 1.

FIG. 1 illustrates a transreflective liquid crystal display (LCD) which is a type of LCD according to an embodiment of the present invention, and FIG. 2 is an enlarged view of a reflecting region of FIG. 1.

Referring to FIG. 1, the transreflective LCD includes a rear substrate 101 and a front substrate 110, a liquid crystal (LC) layer 107 that is placed between the rear substrate 101 and the front substrate 110, and a reflecting region 120 which reflects external light on the rear substrate 101 to illuminate the LC layer 107 and enhances the vertical component (component that traces a y-axis direction in FIG. 1, i.e., component that traces the thickness direction of the LCD) of the reflected light. In FIGS. 1 and 2, a thin film transistor (TFT) 115 is formed on the rear substrate 101, and a common electrode 108 is formed on the front substrate 110.

A buffer layer 102 having a contact hole 116 for partially exposing the TFT 115 is formed on the rear substrate 101. The buffer layer 102 may be formed of a transparent insulating material. The reflecting region 120 is formed in at least a partial region of the buffer layer 102. A medium layer 121 is formed on the buffer layer 101.

In FIG. 1, 50a denotes external incident light rays, 50st denotes light rays in which the external incident light rays 50a reflect off the reflecting region 120, 50stx denotes a light ray component of 50st which traces the x-axis, 50sty denotes a light ray component of 50st which traces the y-axis, and 50BLU denotes light rays provided from the backlight unit (BLU) 100.

Referring to FIG. 2, the reflecting region 120 includes an array of a plurality of reflecting surfaces, for example, an array of concave reflecting curved surfaces 123, which are formed so that at least a portion of the reflecting region 120 toward the front substrate 110 of the medium layer 121 cannot be parallel to the front substrate 110. A stack structure is formed on the array of concave reflecting curved surfaces 123 so that a portion of light reflecting off the concave reflecting curved surfaces 123 can be total internally reflected. The stack structure includes a first medium layer 122 having a first index of refraction and formed to have a flat surface on the array of concave reflecting curved surfaces 123, a second medium layer 126 having a second index of refraction that is smaller than the first medium layer 122, and a third medium layer 127 having a third index of refraction that is larger than the second medium layer 126. A thin, transparent conductive layer 129, for example, an indium tin oxide (ITO) layer, which is electrically connected to the TFT 115 through the contact hole 116 and acts as an electrode, is formed on the third medium layer 127.

An array of reflecting surfaces, for example, an array of concave reflecting curved surfaces 123, is formed on a surface toward the front substrate 110 of the medium layer 121. In this case, the medium layer 121 may be formed of metal, for example, one material selected from the group consisting of aluminum, copper, silver, and gold so that incident light can reflect off the concave reflecting curved surfaces 123. The medium layer 121 may be electrically connected to the TFT 115 through the contact hole 116, like the transparent conductive layer 129, to act as a reflecting electrode.

A scatterer 125 may be further placed inside the first medium layer 122 in a position where the scatterer 125 is separated from the concave reflecting curved surfaces 123 toward the front substrate 110. The position of the scatterer 125 is fixed by the first medium layer 122 with respect to the concave reflecting curved surfaces 123.

Figure 3:
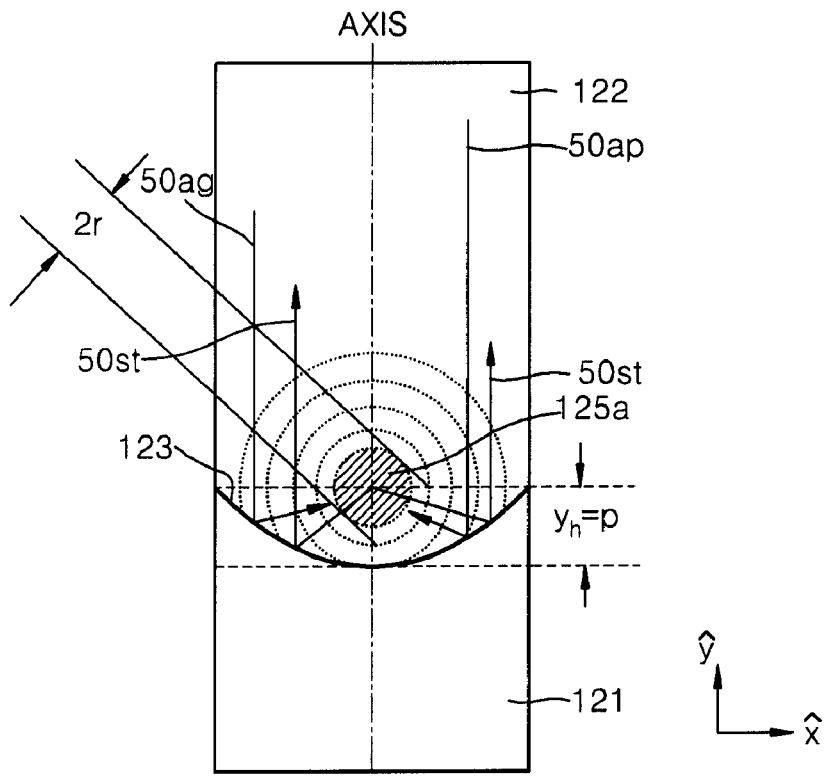
FIGS. 3 through 5 illustrate various embodiments in which the array of reflecting surfaces of FIG. 1 comprises concave reflecting curved surfaces having a paraboloidal concave shape and a scatterer is placed at the focus of the array of reflecting curved surfaces.
Figure 4:
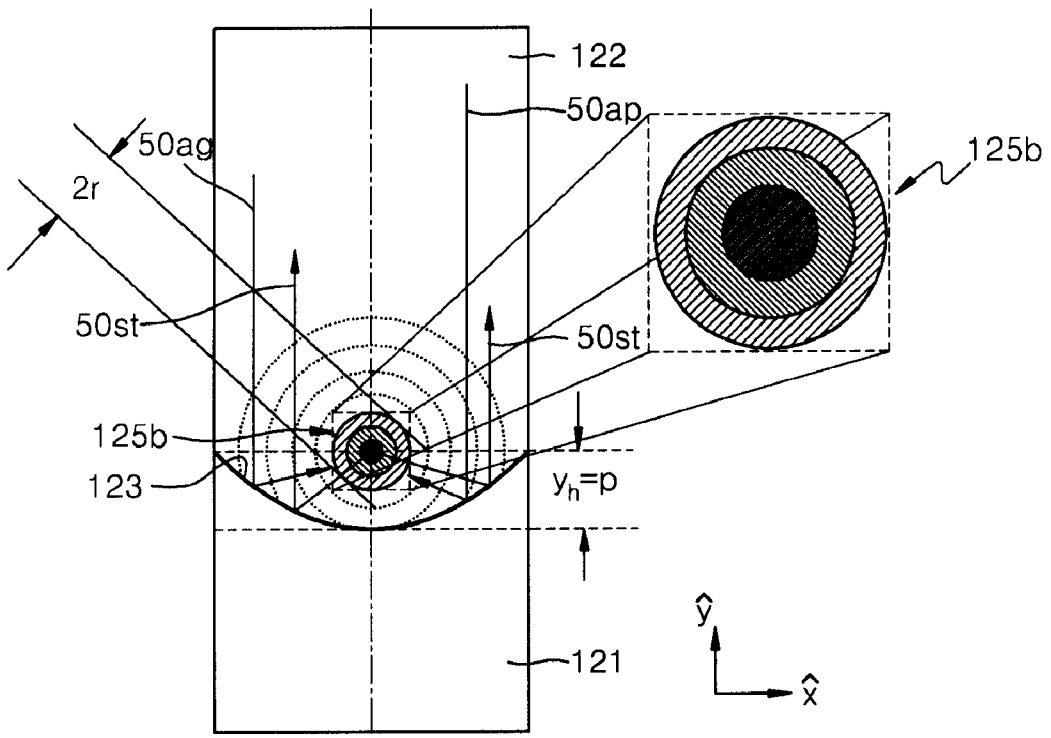
Figure 5:
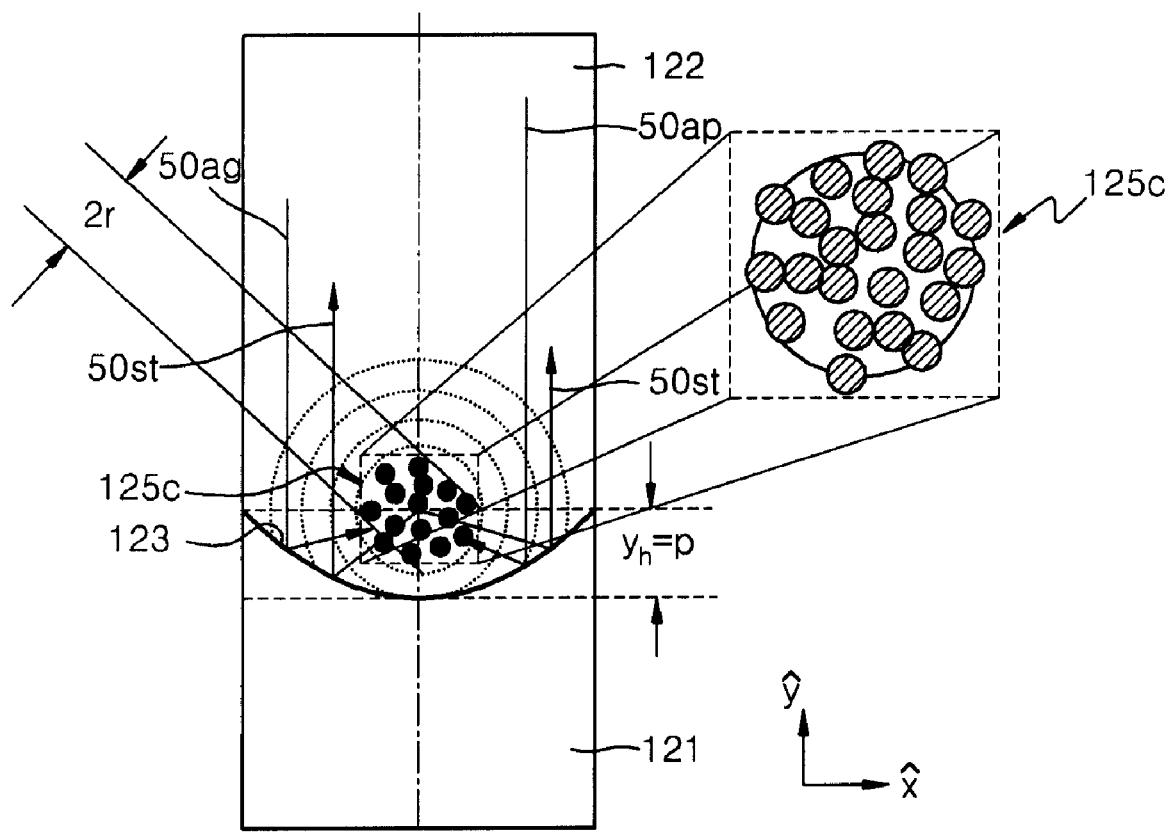

The concave reflecting curved surfaces 123 may be formed to have a parabolical concave so that its cross-section forms a parabola, as illustrated in FIGS. 3 through 5. The scatterer 125 may be placed at the focus of the concave reflecting curved surfaces 123 so that its cross-section forms a parabola or may be centered on the position near the focus. In this case, the height $y_h$ of the concave reflecting curved surfaces 123 may be the same as or larger or smaller than the focal length p of the concave reflecting curved surfaces 123. FIG. 3 shows an example in which the scatterer 125 is placed at the focus of the concave reflecting curved surfaces 123 and the height $y_h$ of the concave reflecting curved surfaces 123 is the same as its focal length p. In FIGS. 3 through 5, 50ag, 50ap, and 50st denote rays.

When the scatterer 125 is disposed at the focus of the concave reflecting curved surfaces 123 in the form of a paraboloid as described above, the ratio of light reflecting off the concave reflecting curved surfaces 123 which substantially contributes to illumination of the LC layer 107 can be significantly increased. This is because, when external light is incident on the scatterer 125, the scatterer 125 causes induced radiation as will be described later, and the concave reflecting curved surfaces 123 in the form of a paraboloid reflects light that starts from their focus and is incident on the concave reflecting curved surfaces 123 and travels parallel to their vertical axis (y-axis).

Meanwhile, FIG. 3 shows an example in which each scatterer 125 is a single spherical scatterer 125a having the radius r. The spherical scatterer 125a may be formed in different sizes at which each color light required for realizing color images is scattered, instead of a single size. In addition, as illustrated in FIG. 4, the scatterer 125 may be a scatterer 125b of a spherical core-shell structure in which a plurality of mediums for scattering different color lights are formed in multiple layers or which is formed of a single medium layer or a plurality of medium layers in a hollow shape or, as illustrated in FIG. 5, may also be an effective spherical scatterer 125c in which scattering particles form a cluster. The number of layers of the scatterer 125b having the spherical core-shell structure is not limited to FIG. 4 and may be various. The scattering particles in the effective spherical scatterer 125c comprised of a cluster formed by scattering particles are not limited to particles of the same type and may be particles of other many types. In addition, the scattering particles are not limited to have the same size and may have various sizes. In addition, the scattering particles may be spherical scattering particles or spherical core-shell structure scattering particles.

Here, FIGS. 3 through 5 illustrate the case where the substantial appearance of the scatterer 125 forms a geometric sphere. The shape of the scatterer 125 is not necessarily limited to a geometric sphere and may be diverse.

When any one of the spherical scatterer 125a, the core-shell structure scatterer 125b, and the effective spherical scatterer 125c is used as the scatterer 125 of FIG. 1, the used spherical scatterer 125a, the core-shell structure scatterer 125b or the effective spherical scatterer 125c is disposed to scatter a plurality of types of color light for realizing color images. In this case, a color filter 109 may be further disposed on the front substrate 110 so as to realize colors, as will be described later.

As another example, the reflecting region 120 may be designed to reflect a particular wavelength or color light only. In order to form the reflecting region 120, the spherical scatterer 125a, the core-shell structure scatterer 125b or the effective spherical scatterer 125c that is used as the scatterer 125 may be provided to scatter a particular wavelength or color light, for example, only one of red (R) light, green (G) light, and blue (B) light. At this time, the size of the spherical scatterer 125a may be determined to scatter particular color light only. The number of layers or the size of the core-shell structure scatterer 125b may be determined to scatter particular color light only. In addition, the size of the scattering particles of the effective spherical scatterer 125c may be determined to scatter particular color light only. When the scatterer 125 is configured to scatter particular color light only in this way, the reflecting region 120 serves as an effective color filter element for particular color light and a color filter is not needed. Thus, embodiments of an LCD according to the present invention for this case will be described later.

Meanwhile, the first medium layer 122 and the third medium layer 127 may be formed of a transparent dielectric material, for example, $SiO_2$. The first medium layer 122 may be formed to completely cover the scatterer 125, as illustrated in FIG. 1.

The second medium layer 126 may be formed of a medium having a smaller index of refraction than the first medium layer 122 and a comparatively larger difference in index of refraction between the first and second medium layers 122 and 126, so as to total internally reflect a portion of light that travels in the second medium layer 126 from the first medium layer 122 at an interface 126a between the first and second medium layers 122 and 126 and to recycle the light toward the array of the concave reflecting curved surfaces 123. For example, the second medium layer 126 may be formed of a vacuum or air gap. In this case, the second medium layer 126 may have an index of refraction of about unity.

In this way, the first and second medium layers 122 and 126 may be formed to totally internally reflect a portion of light that travels in the second medium layer 126 from the first medium layer 122 at the interface 126a between the first and second medium layers 122 and 126.

Light that is totally internally reflected when traveling in the second medium layer 126 from the first medium layer 122, substantially has a large angle of incidence on the second medium layer 126 from the first medium layer 122 and thus has a small vertical component that contributes to illumination of the LC layer 107. At this time, the limit of an incident angle in which total internal reflection is performed, is determined by a difference in index of refraction between the first and second medium layers 122 and 126.

Thus, when light is recycled through the above-described total internal reflection procedure, the vertical component of the light can be enhanced. Thus, compared to the case where light recycling through total internal reflection is not used, the ratio of light that substantially contributes to illumination of the LC layer 107 can be greatly enhanced.

Here, the light that is totally internally reflected when traveling in the second medium layer 126 from the first medium layer 122, is light that is immediately incident on the array of the concave reflecting curved surfaces 123 without passing through the scatterer 125 and then reflects and is incident on the interface 126a at an angle of incidence that is larger than or equal to a critical angle, and light that is incident on the interface 126a at the angle of incidence that is larger than or equal to the critical angle of light excluding light that travels in the array of the concave reflecting curved surfaces 123 of light scattered by the scatterer 125 among external light.

The vertical component of light that substantially contributes to illumination of the LC layer 107 can be greatly enhanced by the reflecting region 120 that is configured as described above.

Meanwhile, referring to FIG. 1, when the second medium layer 126 is formed of a vacuum or air gap, the LCD according to the present invention may further include spacers 128 which support the third medium layer 127 in the second medium layer 126 in the state where the third medium layer 127 is spaced apart from the first medium layer 122 by a predetermined gap. The spacers 128 may be positioned in any one shape of the entire region between reflecting surfaces, all of a region between partial reflecting surfaces, and a portion of a region between at least a portion of reflecting surfaces, as illustrated in FIGS. 6 through 12.

FIGS. 6 through 12 illustrate various exemplary embodiments for the arrangement of the array of the concave reflecting curved surfaces 123 including the scatterer 125 that forms the reflecting region 120 and formation of the spacers 128, which are applied to the LCD according to the present invention. In FIGS. 6 through 12, 120BEV denotes the plan figure of the reflecting region 120.

Figure 6:
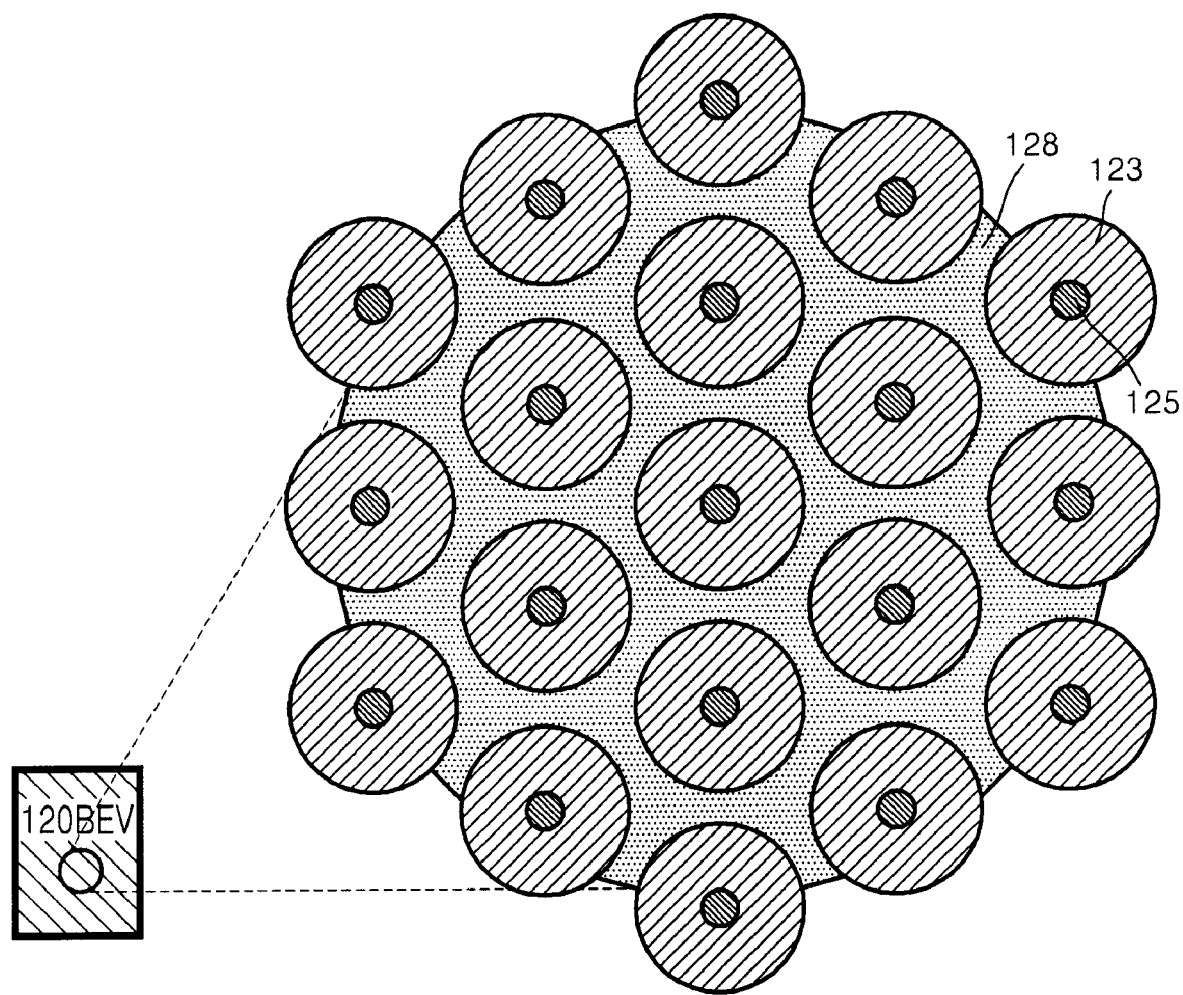
FIGS. 6 through 12 illustrate various embodiments for the arrangement of the array of the concave reflecting curved surfaces including the scatterer that forms the reflecting region, and formation of spacers, which are applied to the LCD according to the present invention.
Figure 7:
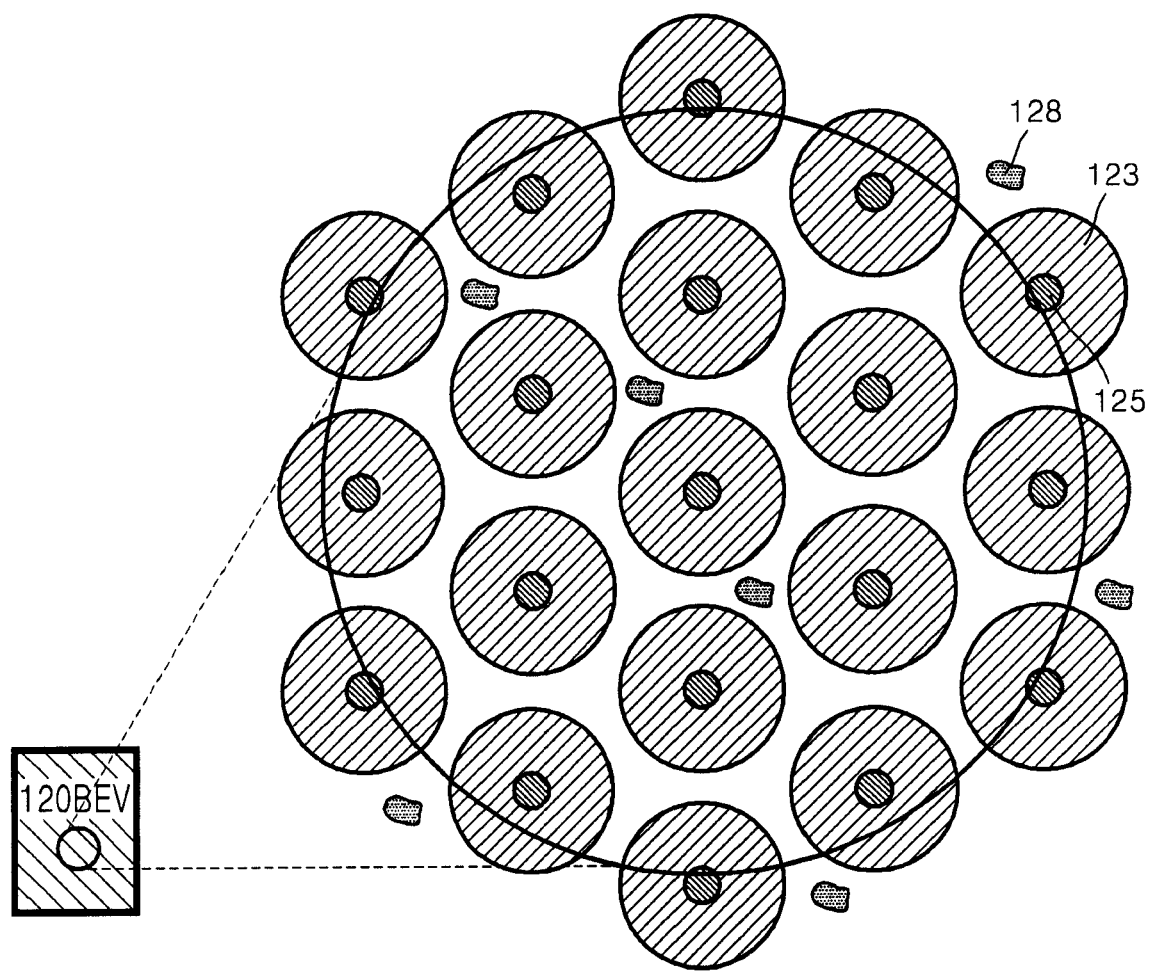
Figure 8:
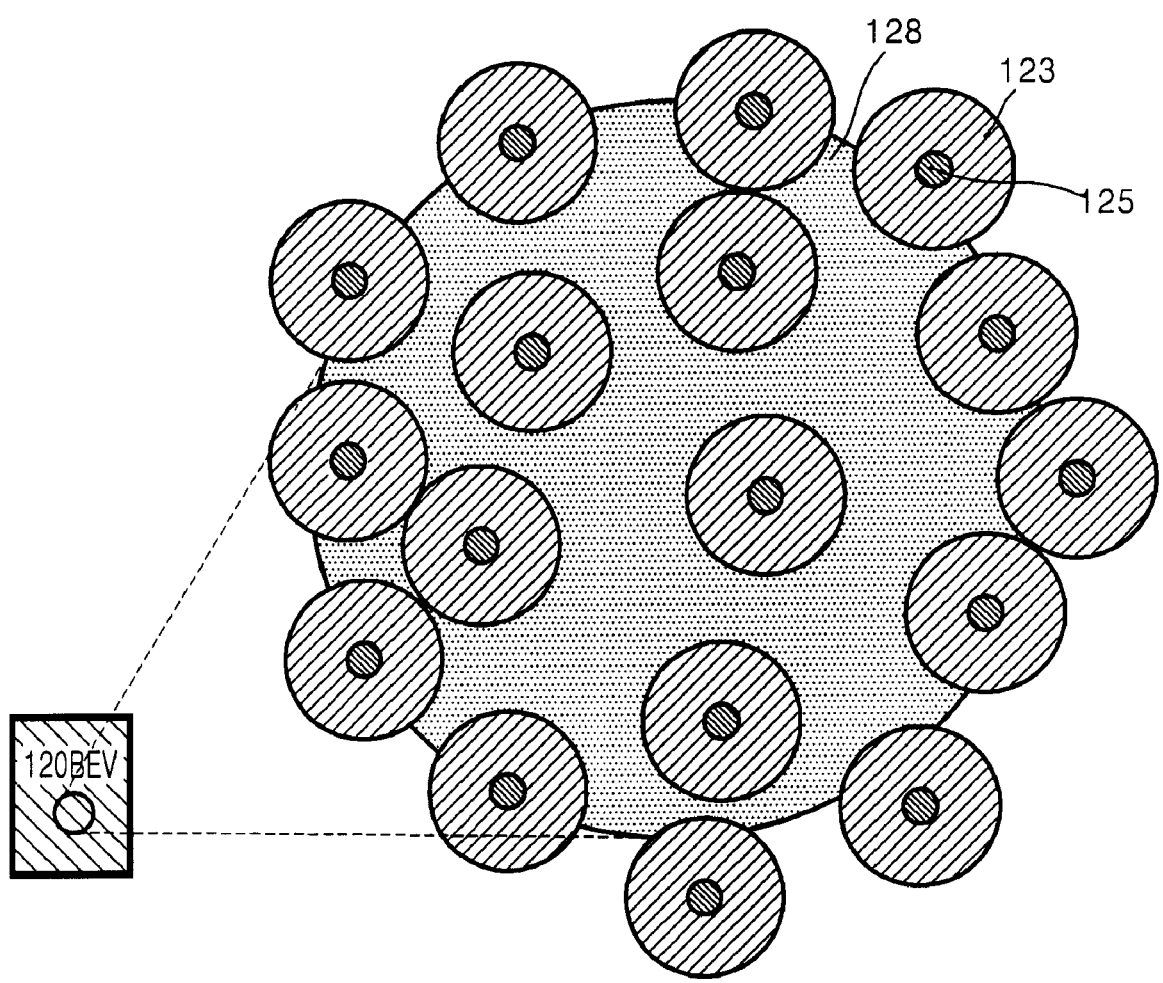
Figure 9:
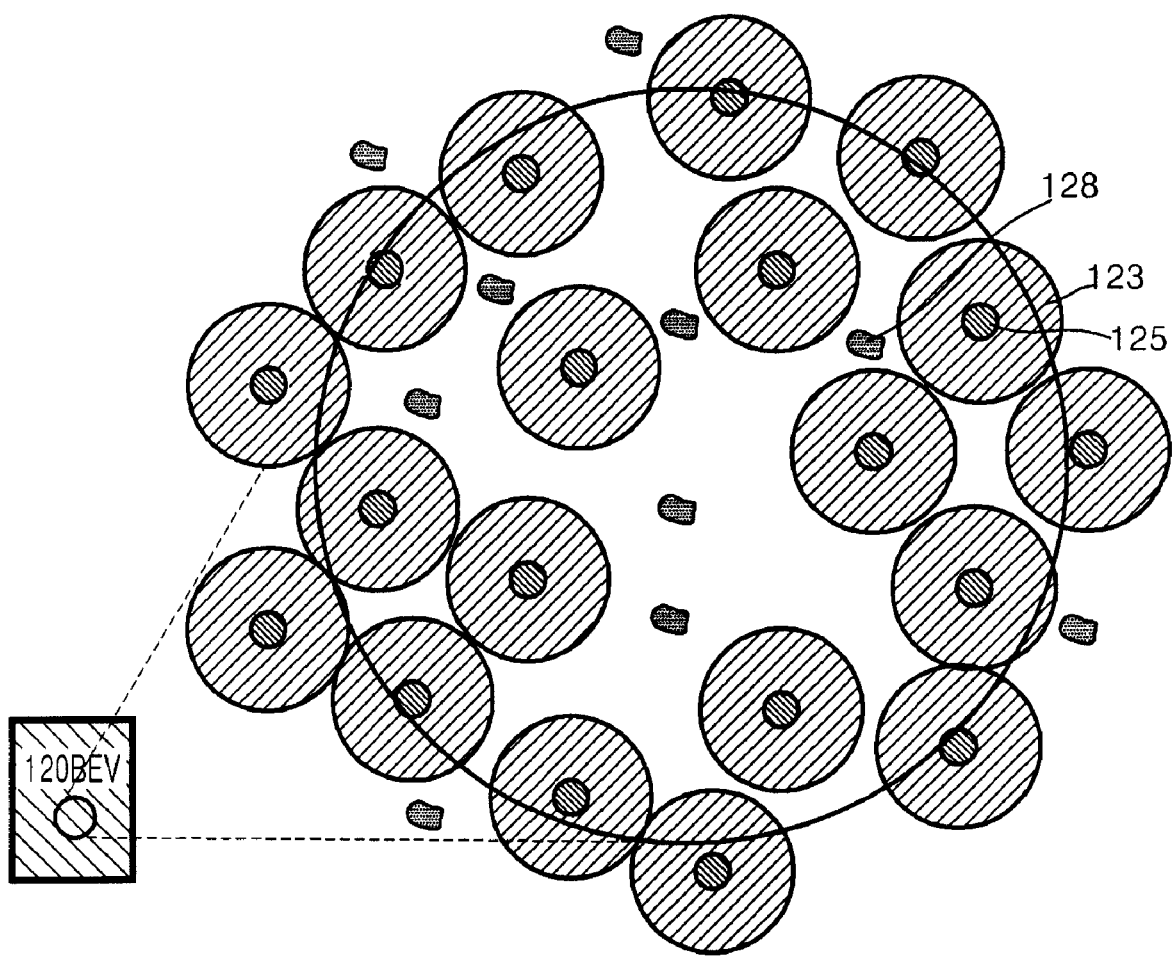
Figure 10:
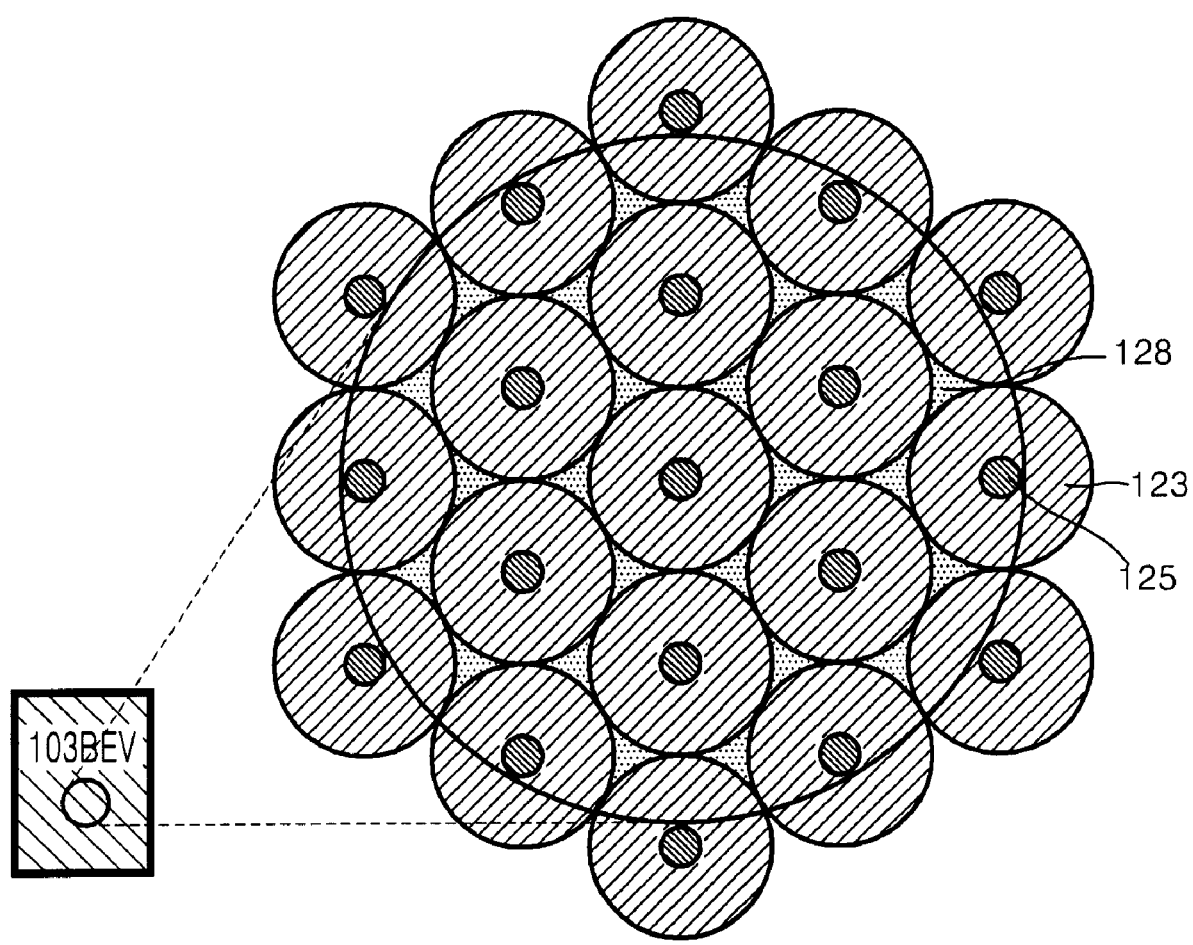
Figure 11:
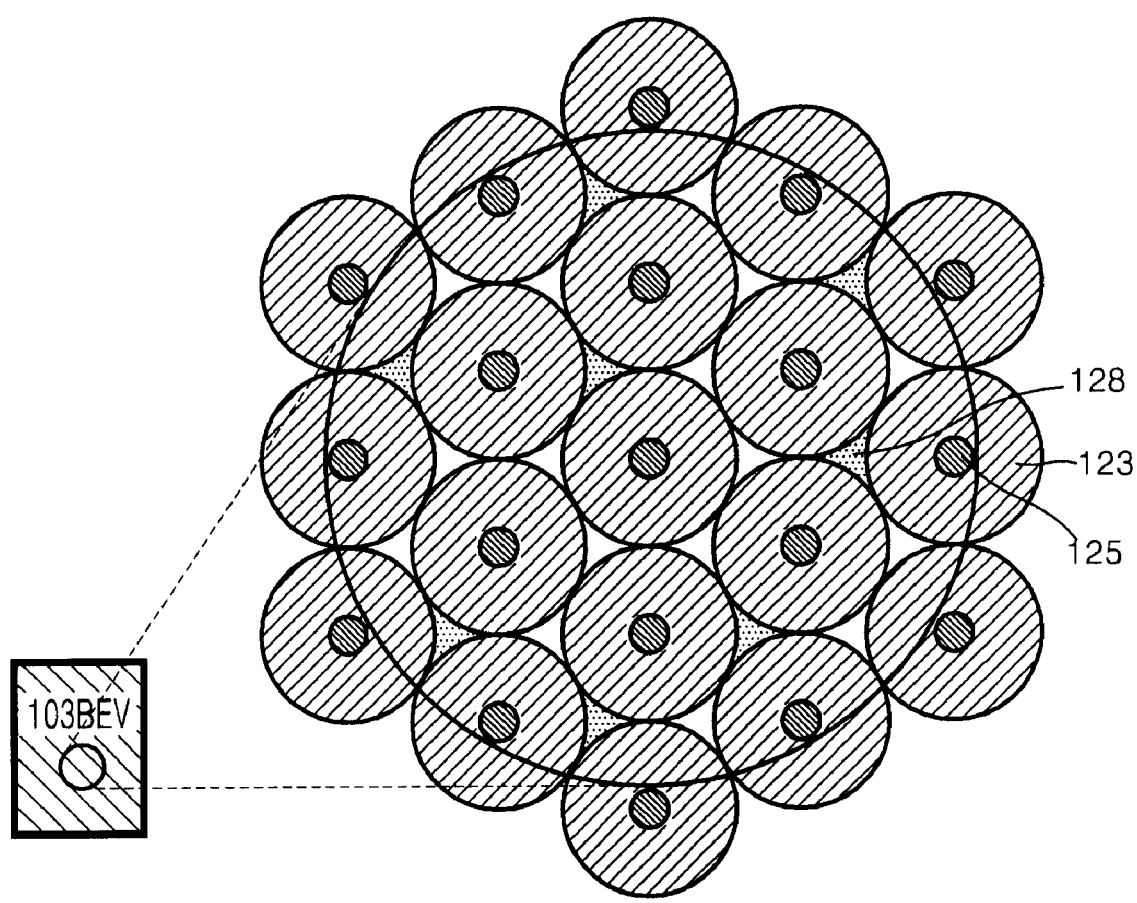
Figure 12:
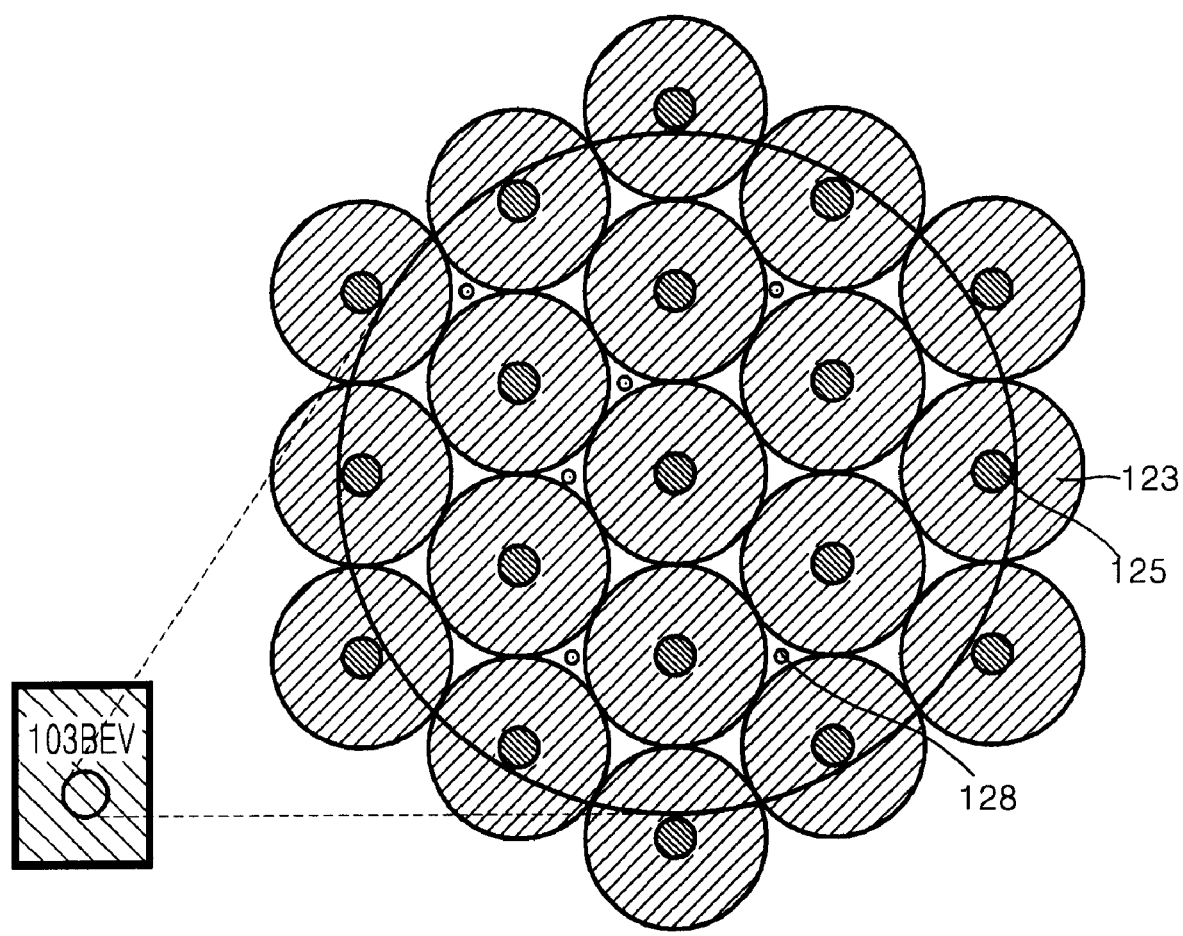

In the LCD according to the present invention, the concave reflecting curved surfaces 123 including the scatterer 125 that forms the reflecting region 120 may be regularly arranged, as illustrated in FIGS. 6, 7, 10, 11, and 12 or may be irregularly arranged, as illustrated in FIGS. 8 and 9. FIGS. 6 and 7 illustrate an example where the concave reflecting curved surfaces 123 are regularly arranged to be spaced apart from one another so as not to contact one another. FIGS. 10 through 12 illustrate an example where the concave reflecting curved surfaces 123 are regularly arranged to contact one another. FIGS. 8 and 9 illustrate an example where the concave reflecting curved surfaces 123 are irregularly arranged to have various shapes in which the concave reflecting curved surfaces 123 contact one another or are spaced apart from one other.

The spacers 128 may be positioned in the entire region between the concave reflecting curved surfaces 123, as illustrated in FIGS. 6, 8, and 10. In addition, the spacers 128 may be positioned in a portion of a region between at least a portion of the concave reflecting curved surfaces 123, as illustrated in FIGS. 7, 9, and 12. In addition, the spacers 128 may be positioned in all of a region between partial concave reflecting curved surfaces 123, as illustrated in FIG. 11.

Figure 13:
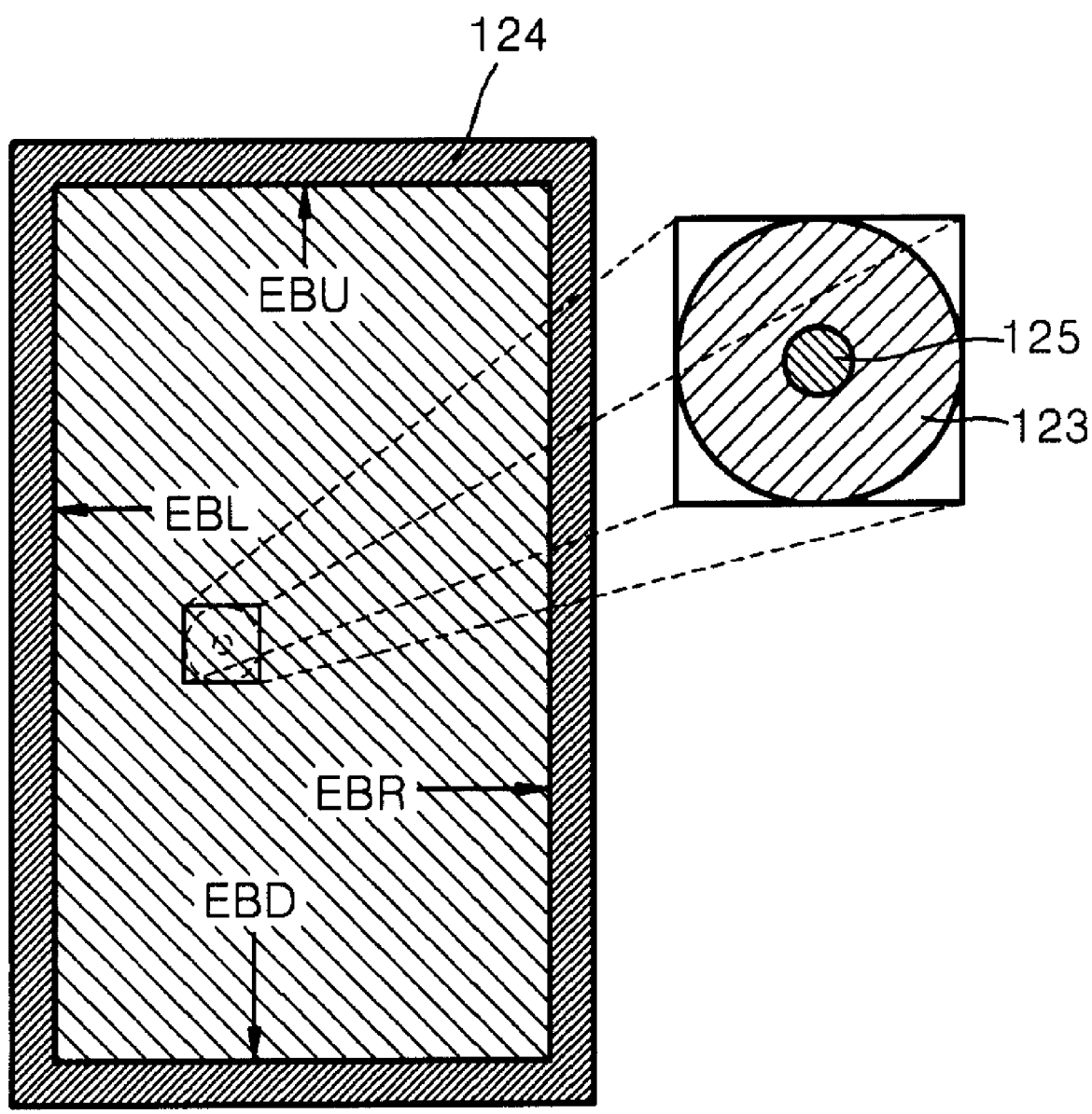
FIG. 13 illustrates a reflecting block which encompasses the reflecting region having an array of a plurality of reflecting surfaces and a stack structure allowing recycling through total internal reflection in units of one pixel or subpixel in the LCD according to the present invention.

Meanwhile, the LCD according to the present invention may further include a reflecting block 124 which encompasses the reflecting region 120 having an array of a plurality of reflecting surfaces and a stack structure allowing recycling through total internal reflection in units of one pixel or subpixel, as illustrated in FIG. 13. In FIG. 1, for explanatory conveniences, the reflecting block 124 is not shown, and FIG. 2 illustrates the case where the reflecting block 124 is formed at the circumference of a region in which three concave reflecting curved surfaces 123 are formed.

In order to prevent total internally reflected rays from being deviated from terminating ends such as EBU, EBD, EBR, and EBL of one pixel or subpixel, each terminating end is blocked by the reflecting block 124, as illustrated in FIGS. 2 and 13. The reflecting block 124 is used to reflect rays to return to the reflecting region 120 within one pixel or subpixel, for example, and to experience other round of total internal reflection. The reflecting block 124 may be formed of a material having high reflectivity such as aluminum or silver. The reflecting block 124 may be formed of the same material as the spacers 128.

Meanwhile, the LCD according to the present invention may further include a color filter 109 to display color images, as illustrated in FIG. 1. The color filter 109 may be disposed on the front substrate 110, as illustrated in FIG. 1, but the present invention is not limited to this. In other words, the color filter 109 may be also disposed between the reflecting region 120 and the LC layer 107. When the LCD is used for a single color, the color filter 109 is excluded.

In FIG. 1, the LCD according to the present invention further includes a backlight unit (BLU) 100 located at the back of the rear substrate 101 so that the LCS is a transreflective LCD, and the reflecting region 120 is partially formed, and a transmissive region 130 through which illumination light from the BLU 100 passes is further formed.

As illustrated in FIG. 1, the transmissive region 130 may be formed in a portion of a region in which a TFT 115 does not exist, for example. The transparent conductive layer 129 may be formed not only on the reflection region 120 but also the transmissive region 130. Here, when the array of the reflecting surfaces of the reflecting region 120 serves as a reflecting electrode, the transmissive region 130 may be electrically connected to the medium layer 121 of the reflecting region 120 so that the transmissive region 130 also, substantially serves as a transparent electrode.

During the daylight or in places where a sufficient ambient light source is present, the LCD according to an embodiment of the present invention as described above does not operate the BLU 100, and only light 50a that is incident from the outside reflects off the reflecting region 120 and the LC layer 107 is illuminated. Thus, the LCD is used as a reflective LCD.

During nights or in dark environment, the LCD according to an embodiment of the present invention operates the BLU 100 to illuminate the LC layer 107 using light rays 50BLU from the BLU 100. In this case, when some external light exists, externally-incident light 50a is also used as illumination light together with the light rays 50BLU from the BLU 100.

Figure 14:
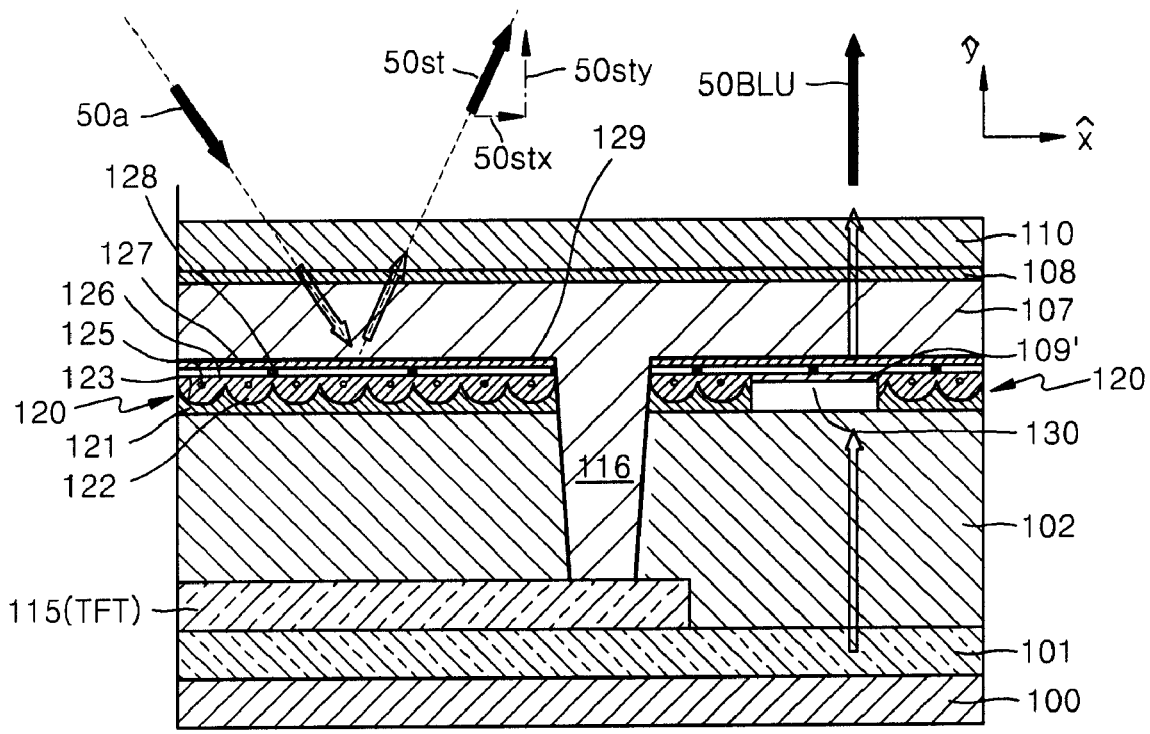
FIGS. 14 and 15 illuminate an LCD according to another embodiments of the present invention, which illustrate embodiments of a transreflective LCD when the scatterer reflects particular color light only.
Figure 15:
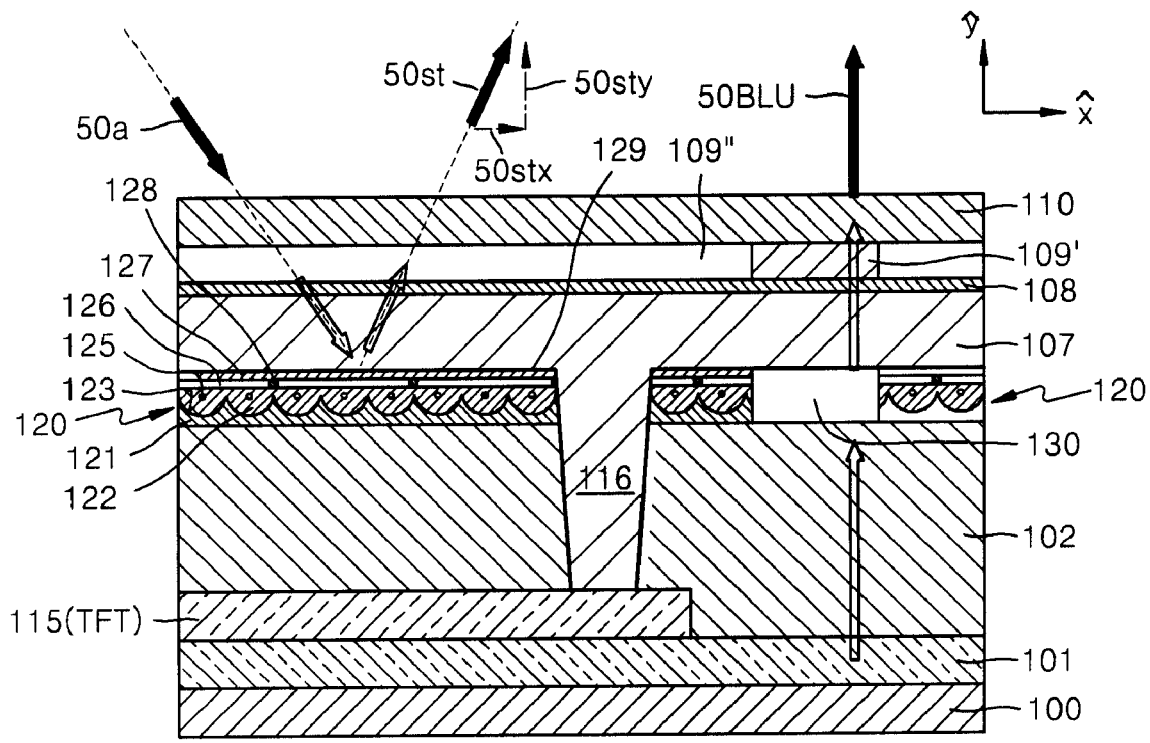

FIGS. 14 and 15 illuminate an LCD according to other embodiments of the present invention, which illustrate embodiments of a transreflective LCD when the scatterer 125 reflects particular color light only. Here, the same elements as in FIG. 1 are marked as same reference numerals and a repeated description thereof will be omitted when possible.

Referring to FIGS. 14 and 15, when the scatterer 125 scatters particular color light only, since the reflecting region 120 reflects particular wavelength or color light in the range of wavelength only, the reflecting region 120 substantially serves as an effective color filter element for particular color light. In this case, portions illustrated in FIGS. 14 and 15 indicate one of a plurality of subpixels that form one pixel (unit pixel) of an LCD.

For example, the reflecting region 120 is formed to reflect any one of red light, green light, and blue light by scattering of the scatterer 125. Thus, the LCD has a two-dimensional array arrangement of a unit of three reflecting regions 120 disposed to reflect red light, green light, and blue light, respectively.

When the reflecting region 120 reflects particular color light only, as described above, the color filter 109 of FIG. 1 is not needed.

Instead, a red, green or blue color filter element 109' may be formed so that only the same color light as particular color light reflecting off the reflecting region 120 passes through a region corresponding to the transmissive region 130, of illumination light from the BLU 100 as illustrated in FIG. 14. FIG. 14 illustrates an example in which the color filter element 109' is formed at a surface near the LC layer 107 of the transmissive region 130. FIG. 15 illustrates an example in which the color filter element 109' is formed at the position of the color filter 109 of FIG. 1 and its peripheral part is formed of a transparent material layer 109".

Here, in case of FIG. 1 in which the scatterer 125 scatters a plurality of types of color light, a portion illustrated in the drawing may correspond to one pixel of an LCD or one of a plurality of subpixels that form one pixel.

Figure 16:
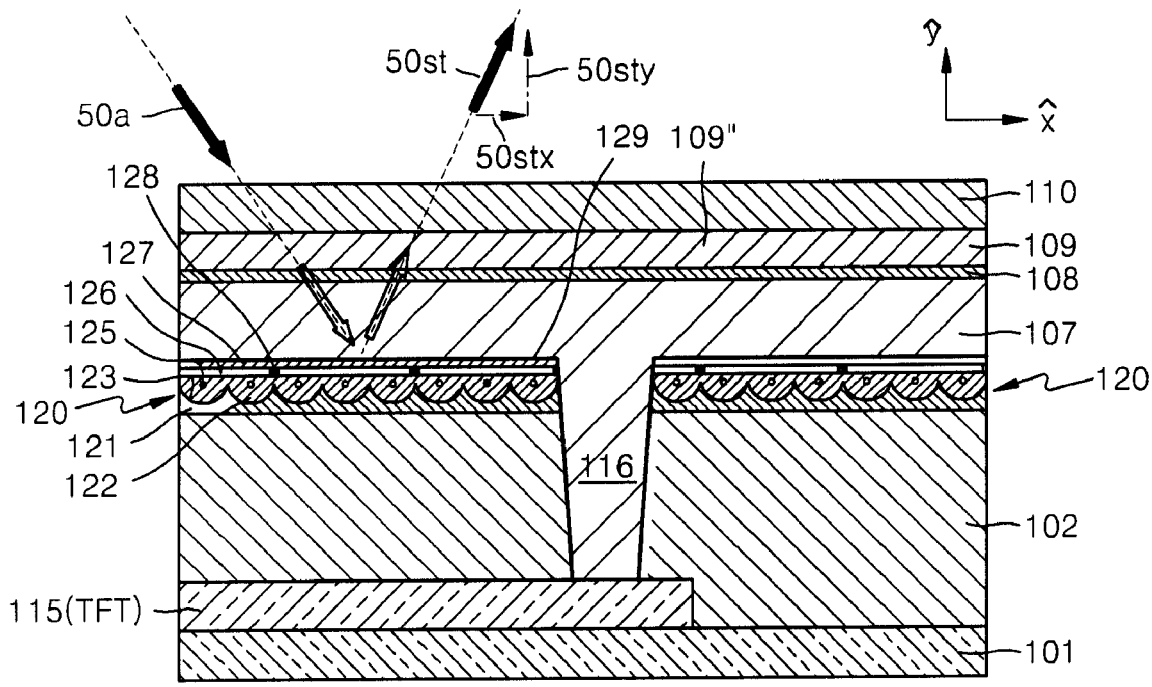
FIG. 16 illustrates an example in which an LCD is a reflective LCD, according to another embodiment of the present invention.

FIG. 16 illustrates an example in which an LCD is a reflective LCD, according to another embodiment of the present invention.

As illustrated in FIG. 16, the LCD according to the present invention may not include a BLU 100 and a transmissive region 130 as illustrated in FIGS. 1, 14, and 15 but includes only a reflecting region 120. In this case, the reflecting region 120 may be formed on the entire surface of the rear substrate 101 excluding a contact hole 116 for electrical connection with a TFT 115.

In addition, FIG. 16 illustrates a structure corresponding to FIG. 1. The reflective LCD may also have a structure corresponding to FIG. 14 or 15. That is, in the reflective LCD according to the present invention, the scatterer 125 scatters particular color light only, the reflecting region 120 serves as an effective color filter element for particular color light, and a color filter 109 may also be excluded. This can be sufficiently inferred from the description and illustration of the above-described various embodiments and thus illustration thereof will be omitted.

Meanwhile, as described above, the LCD according to the present invention may include an array of concave reflecting curved surfaces 123 as an array of reflecting surfaces of the reflecting region 120 and the scatterer 125 is provided at the focal position of the concave reflecting curved surfaces 123. The LCD according to the present invention may include an array of concave reflecting curved surfaces 123, as illustrated in FIG. 17, for example, an array of concave reflecting curved surfaces having a cross-section of a paraboloidal concave, or an array of convex reflecting curved surfaces 223, as illustrated in FIG. 18, for example, an array of convex reflecting curved surfaces having a cross-section of a paraboloidal convex, having no scatterer.

Figure 17:
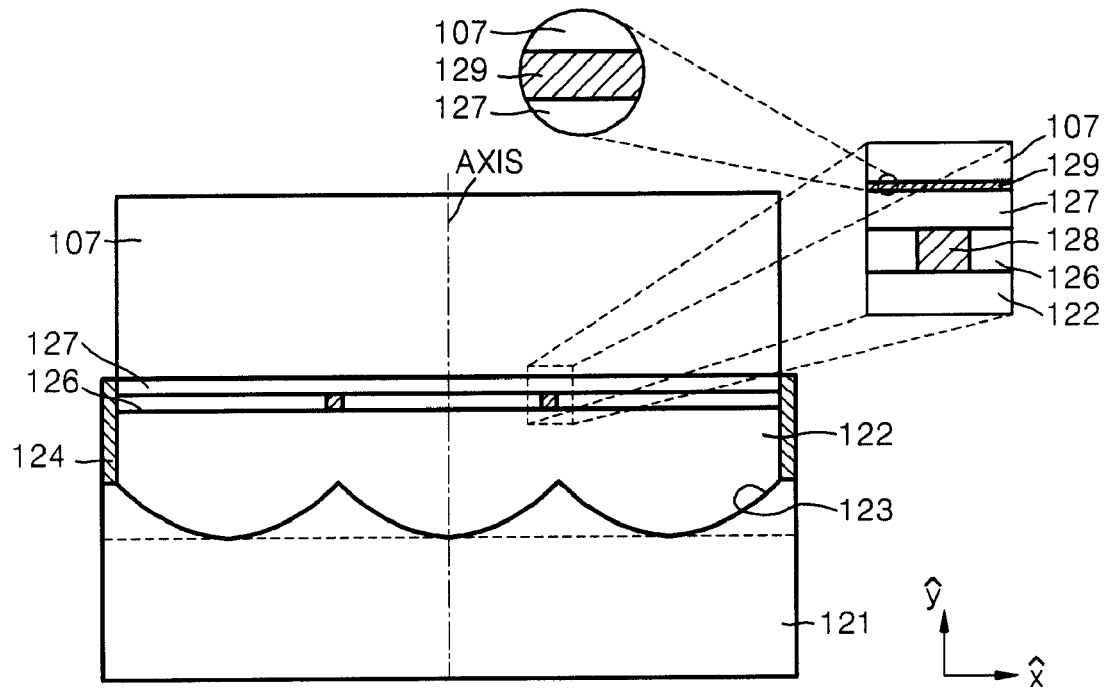
FIG. 17 illustrates an embodiment of a reflecting region for the case where the LCD according to the present invention includes an array of concave reflecting curved surfaces as an array of reflecting surfaces of a reflecting region without a scatterer.
Figure 18:
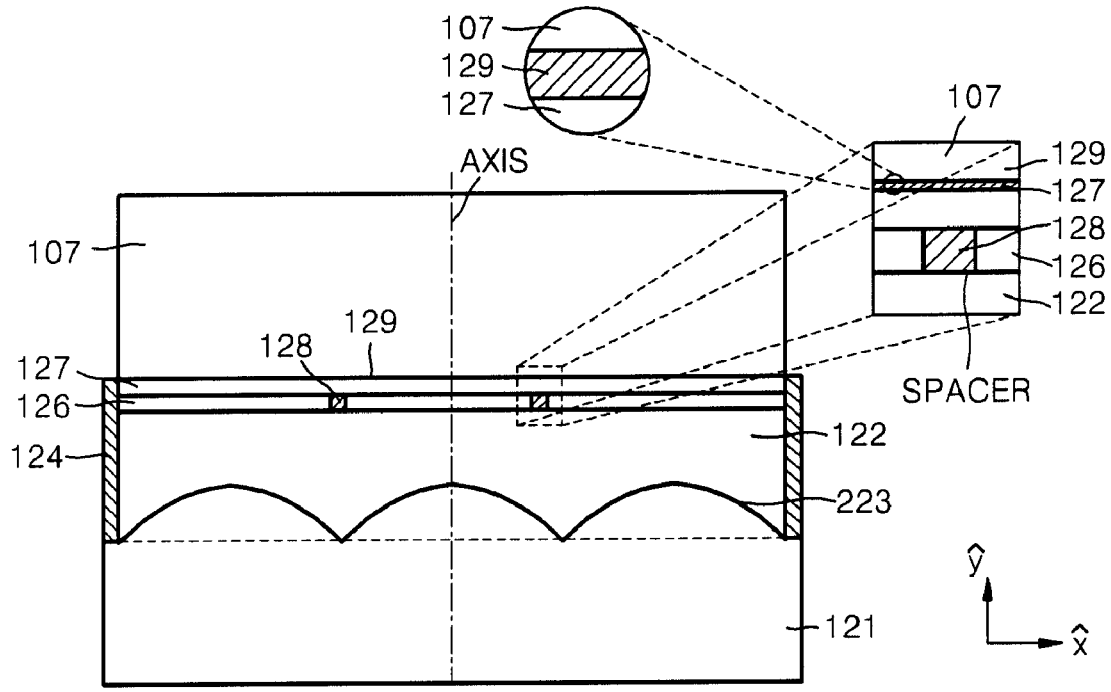
FIG. 18 illustrates an embodiment of a reflecting region for the case where the LCD according to the present invention includes an array of convex reflecting curved surfaces as an array of reflecting surfaces of a reflecting region without a scatterer.

In this case, the arrangement of the array of concave reflecting curved surfaces 123 of FIG. 17 or the array of convex reflecting curved surfaces 223 of FIG. 18 and the arrangement and shape of the spacers 128 may be diverse, as in the array of concave reflecting curved surfaces 123 having the scatterer 125 of FIGS. 6 through 12.

The LCD including only the array of concave reflecting curved surfaces 123 having no scatterer 125 as illustrated in FIG. 17 and the LCD including only the array of convex reflecting curved surfaces 223 having no scatterer 125 as illustrated in FIG. 18 can be sufficiently inferred from other embodiments of the LCD of FIG. 1 and the reflecting region 120 of FIGS. 17 and 18 and thus, illustration thereof will be omitted.

Meanwhile, in the above-described various embodiments, the LCD according to the present invention includes the TFT 115 disposed on the rear substrate 101 and the transparent common electrode layer 108 disposed on the front substrate 110 but the present invention is not limited to this. That is, the TFT 115 may also be formed on the front substrate 110 and the common electrode layer 108 may also be formed on the rear substrate 101. In this case, a contact hole 116 is not formed in the rear substrate 101, a buffer layer 102 is formed on the entire surface of the rear substrate 101, and the common electrode layer 108 is formed on the buffer layer 102. Such a modified example can be inferred from the above description and thus, illustration thereof will be omitted.

As described above, the LCD according to the present invention includes the TFT 115 but the present invention is not limited to this and various modifications are possible.

Hereinafter, the grounds that the reflecting region 120 is provided to enhance the vertical component of light that is incident from the outside and reflects off the reflecting region will be described with respect to the structure of the reflecting region 120 of FIG. 2 as an example.

The important principle of a reflective LCD technology is that a reflecting layer is added to the back of the LC layer 107 to guide light from a light source encompassing the LC layer 107 to illuminate it in the LCD, that is, light from an external light source, and to eliminate the necessity of the BLU 100. In an idealistic reflective LCD, its reflecting layer has a characteristic that all incident light from a light source encompassing the reflecting layer at a predetermined angle of incidence is completely reflected in the direction of the LC layer 107.

In details, referring to FIG. 1, in the idealistic LCD, light rays 50st of FIG. 1 that are incident from the outside and reflect off the reflecting region 120 may be the same as light rays 50 BLU provided from the BLU 100. This means that the light rays 50st have a component tracing a y-axis, that is, a vertical component only.

In order to enhance the vertical component of the reflecting light rays 50st, the reflecting region 120 should be improved to maximize a light ray component 50sty of the reflecting light rays 50st that traces the y-axis and to minimize a light ray component 50stx of the reflecting light rays 50st that traces the x-axis.

First, the contour of a paraboloidal reflective concave having a scatterer at its focus is analyzed to be used as a reference for describing the performance of directed reflectance in the LCD having the reflecting region 120 having the above-described structure according to the present invention. In order to keep an analysis as concise and concrete as possible, only the cross-section of a paraboloidal concave is considered. Hereinafter, the cross-section of the paraboloidal concave is indicated by a parabolical concave.

Figure 19:
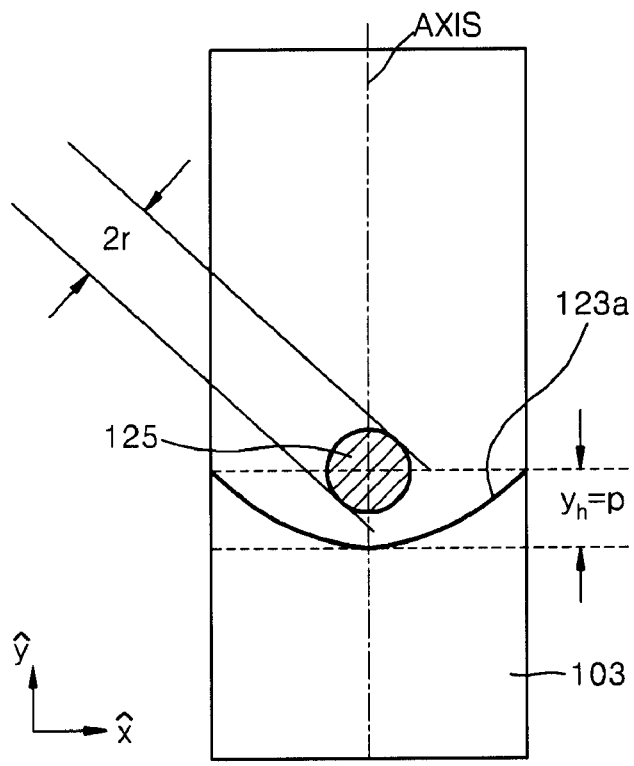
FIG. 19 illustrates a parabolical concave reflecting surface having focal length p and height $y_h$=p.

In FIG. 19, p is a focal length. FIG. 19 illustrates the height $y_h = p$ of a parabolical concave reflecting surface 123a.

The parabolical concave reflecting surface 123a of FIG. 19 is a cross-section defined by Equation 1

$$y = \frac{x^2}{4p} \quad (1)$$

Figure 20:
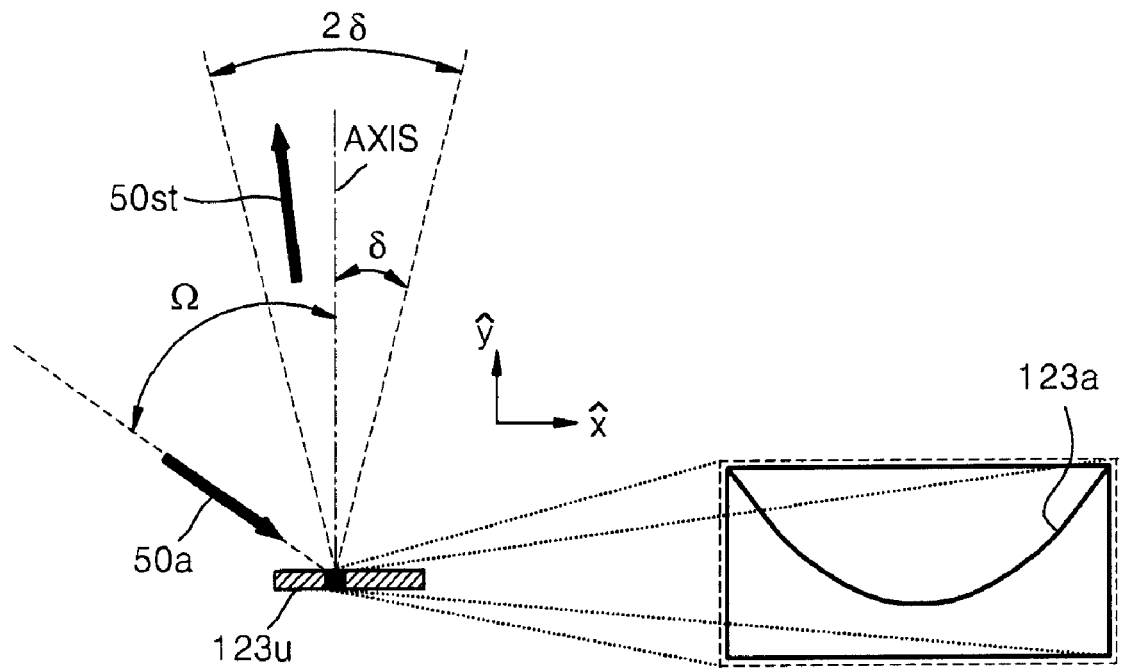
FIG. 20 illustrates an apparatus for measuring electromagnetic scattering.

When determining the performance of a reflector, a detector is first placed some distances away from the reflector and the actual number rays that are reflecting off the reflector and that are able to reach the detector reflects the performance of the reflector. An apparatus for measuring electromagnetic scattering which will be used throughout this investigation is shown in FIG. 20. A light ray 50a is incident on a reflective structure at an angle of incidence of Ω. The incidence light ray 50a reflects off a reflector 123u and the resulting reflected ray is 50st. The detector, which is placed somewhere along the parabolical axis and in the y-axis direction from the reflector 123u, is constrained in that only those reflected rays 50st with their angles of reflectance less than or equal to δ° get detected.

Figure 21:
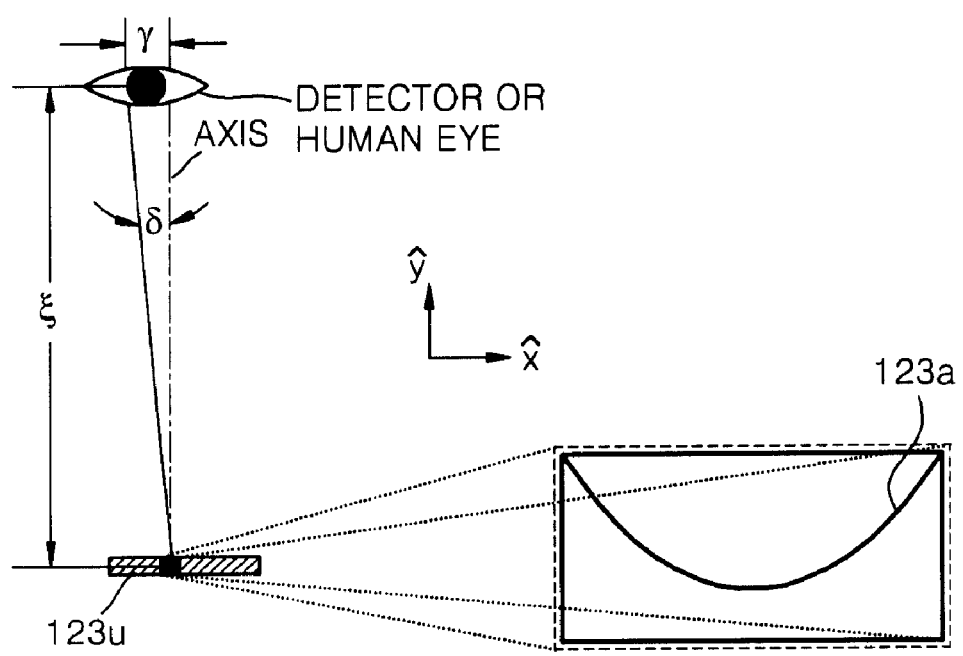
FIG. 21 illustrates determination of a detection angle δ.

For example, as illustrated in FIG. 21, the δ° might be the factor associated with the size of human eye if the detector is that of human eye, etc. The enlarged views of the parabolical concave reflecting surface 123a in FIGS. 20 and 21 are added for the purpose of illustration only.

The detection angle δ can be expressed by Equation 2

$$\delta = \arctan\left(\frac{\gamma}{\xi}\right) \quad (2)$$

, where ξ is the distance between the reflector and the detector and γ is the width of the detector, as illustrated in FIG. 21. Considering the human eyeball as a physical detector, the width γ~1 cm. And, for a detector placed one meter away from the scatterer, the ξ=1 m, i.e., γ<<ξ, which gives for the detection angle δ, to a good precision, as expressed by Equation 3, $$\delta = \arctan\frac{\gamma}{\xi} \quad (3)$$

$$\cong \arctan(0.01)$$

$$= 0.57294°$$

When it is assumed that the detector is placed a half meter away from the reflector 123u, the detection angle δ would still be in the order of δ≅arctan(0.02)=1.1458°. The small value with respect to the detection angle δ implies that only light rays having a very small x-axis light ray component of the reflecting light rays 50st will reach the detector.

The performance of directed reflectance may be improved significantly by placing the scatterer 125 at the focus of the parabolical concave reflecting surface 123a. "Induced radiation" by a scatterer is used to improve the performance of directed reflectance.

When an incident beam of electromagnetic wave interacts with the scatterer such as a metallic spherical particle, polarization gets induced in the scatterer. Induced polarization is the result of charges on scatterer responding against an incident electric field. Since electromagnetic waves such as light are oscillating in time and space, induced polarization in the scatterer is also oscillating at the same frequency of incoming electromagnetic wave. Electrodynamics tell us that, when there is oscillation in polarization, there results in radiation, implying that the spherical scatterer placed at the focus of a shallow parabolical concave irradiates. It is well known that for a parabolical concave reflection surface, any ray originating from its focal point would reflect off its surface and travel parallel to the parabolical axis. Since the induced rays are originating from a spherical scatterer placed at the focus of a parabolical concave, all such induced rays reflect off the parabolical concave reflecting surface 123a and travel parallel to the axis of a parabolical axis, eventually getting collected by the detector placed somewhere along that direction.

Although the performance of directed reflectance in a structure in which the scatterer 125 is placed at the focus of the parabolical concave reflecting surface 123a illustrated in FIG. 19 proves to be a significant improvement over that of a simple parabolical concave reflecting surface without a spherical scatterer, it still has much room for an improvement. When a time varying polarization field gets induced by the scatterer 125 and begins to radiate, the irradiation rays travel in all directions. Irradiated rays that are confined within δ° such as 50G1 and 50G2 of FIG. 22, and irradiated rays that are reflecting off the parabolical concave reflecting surface 123a such as 50G3 and 50G4 of FIG. 22 get collected by a detector and contribute to the performance enhancement of directed reflectance. However, those irradiated rays confined within 90-δ° such as 50R1 and 50R2 are simply wasted as these cannot be collected by the detector. Of course, this is due to the detector's limited size, i.e., the half window width δ. In the present invention, the performance of directed reflectance may be further improved by taking advantage of the effect known as total internal reflection.

Figure 23:
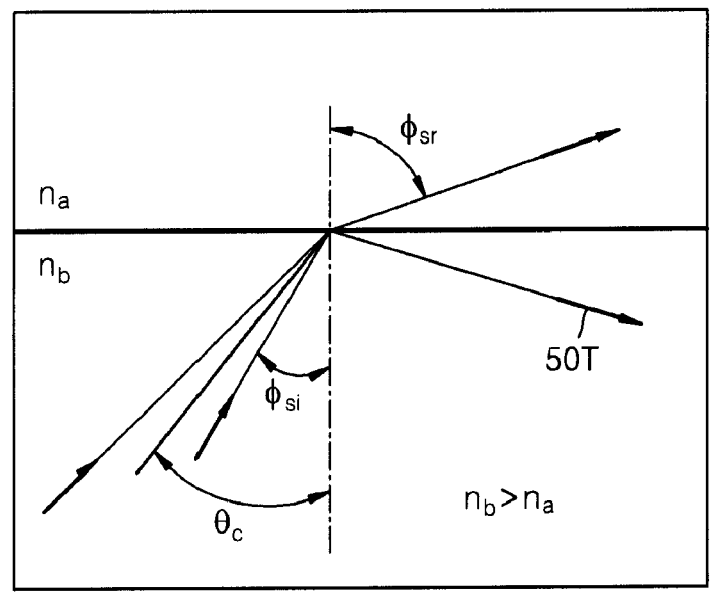
FIG. 23 illustrates the principle of total internal reflection.

As illustrated in FIG. 23, when light travels from the medium of index of refraction $n_b$ to the medium of index of reflection $n_a$, the refracted and incidence rays are related by the Snell's law, $$n_b \sin(\Phi_{si}) = n_a \sin(\Phi_{sr}) \quad (4)$$

, where $\Phi_{si}$ is the angle of incidence and $\Phi_{sr}$ is the angle of refraction as illustrated in FIG. 23. In case where $n_b > n_a$ and the light is incident from $n_b$ side of medium to $n_a$, the phenomenon of total internal reflection occurs when the incidence angle $\Phi_{si}$ becomes greater than the critical angle $\theta_c$, which expression is given by $$\theta_c = \arcsin\left(\frac{n_a}{n_b}\right) \quad (5)$$

, where ray 50T illustrated in FIG. 23 is total internally reflected ray.

Figure 22:
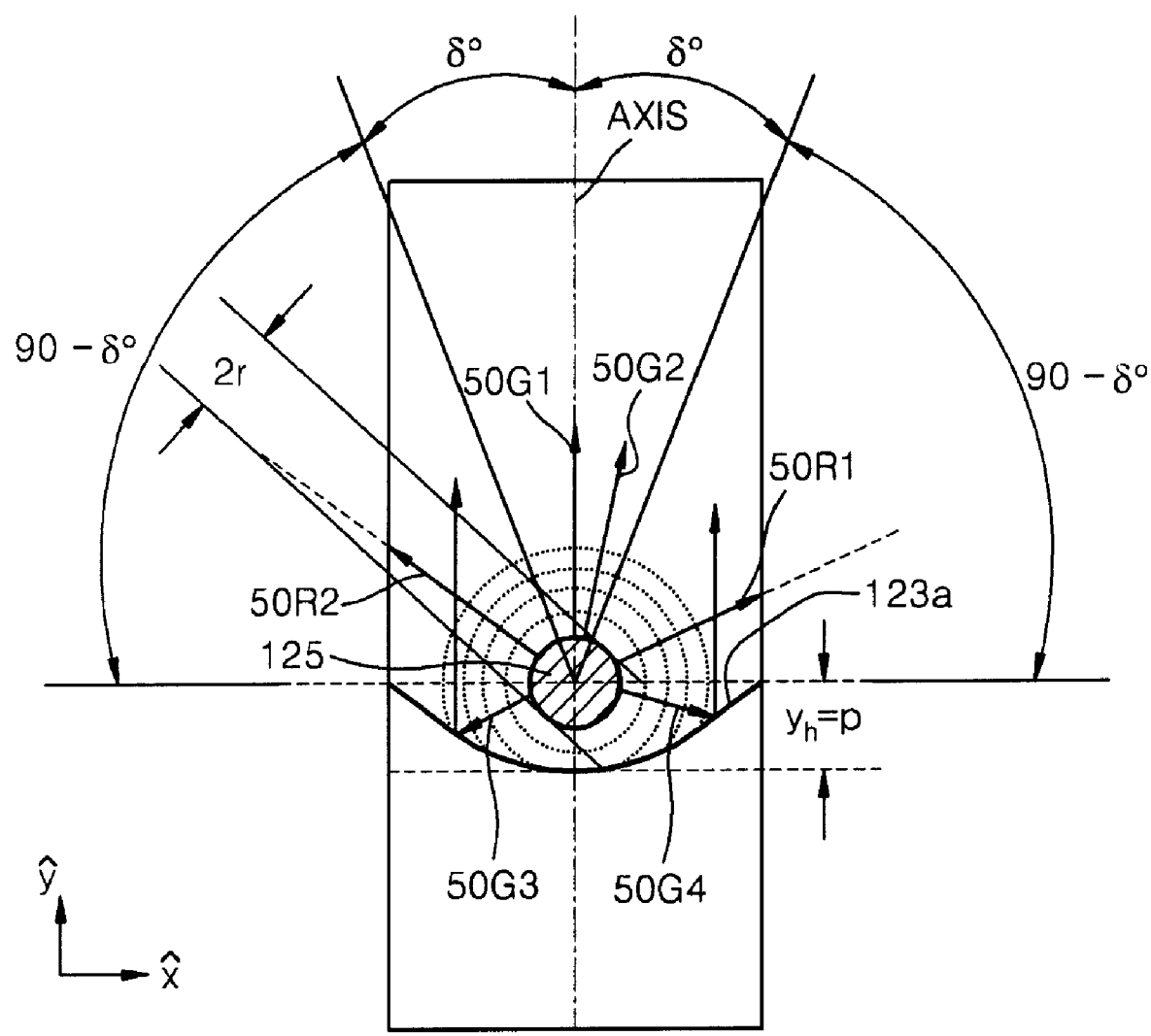
FIG. 22 illustrates wasted scattering light when a scatterer is placed at the focus of a parabolical concave having the height $y_h$=p and total internal reflection is not used.

If the wasted rays such as 50R1 and 50R2 in FIG. 22 can be made to go through total internal reflection, the resulting total internally reflected rays may be used to induce polarization in neighboring spherical scatterers 125. Some of the resulting extra induced rays out of such neighboring spherical scatterers would be irradiating in the direction parallel to the axis of parabolical concave reflecting surface 123a, and this would further enhance the performance of directed reflectance.

Figure 24:
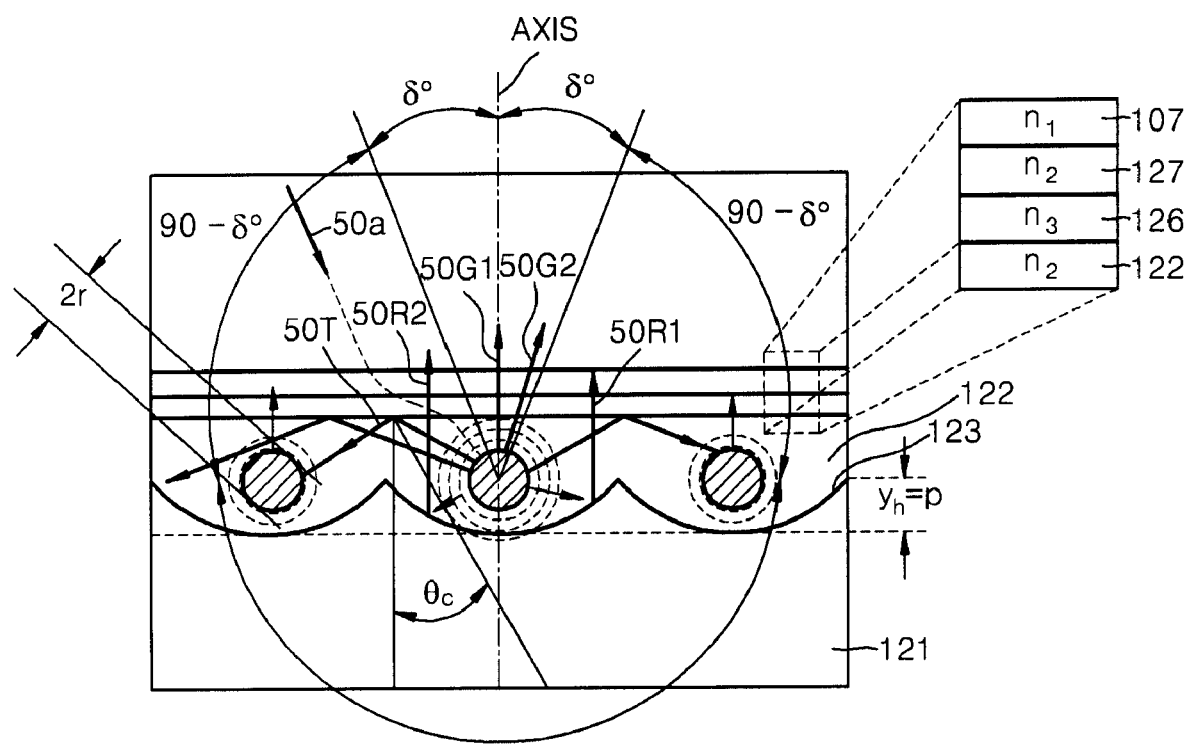
FIG. 24 is an illustration for explaining the present invention for using total internal reflection so as to reduce a scattering power loss.

FIG. 24 illustrates the present invention using total internal reflection so as to reduce a scattering power loss. In the LCD according to the present invention, enhancement of light that substantially contributes to illumination of an LC layer corresponds to improvement in performance of directed reflectance resulting in an increase in the amount of light detected by a detector when the performance of a reflecting region is evaluated. In FIG. 24, a layer having an index of refraction $n_2$ corresponds to a first medium layer 122 and a third medium layer 127, and a layer having an index of refraction $n_3$ corresponds to a second medium layer 126, for example, a vacuum or air gap, and a layer having an index of refraction $n_1$ may be an LC layer 107.

Referring to FIG. 24, by choosing $n_3 < n_2$, where $n_2$ and $n_3$ are associated refractive indexes for each medium, the irradiated rays within 90-δ° can be made to reflect internally assuming that the proper values for $n_2$ and $n_3$ are chosen, of course. The total internally reflected ray such as 50T would then excite neighboring spherical scatterers to result in outgoing rays of induced radiation of which some of them would be collected by the detector placed somewhere along an axis of a parabolical concave. The extra reflected rays collected by the detector implies increased performance in directed reflectance.

In order to maximize the enhancement of the performance in directed reflectance by total internal reflection, it is desired to make $\theta_c$ as small as possible. This is due to the small value for δ, which is the half width window for a detector, illustrated in FIGS. 20 and 21. Small δ implies a large value for 90-δ°, which is the region containing wasted reflected rays; and this is the reason for the requirement that $\theta_c$ be as small as possible. The medium which is immediately available and has the smallest value for $n_3$ is a vacuum, i.e., an empty space. A true vacuum is not impossible but is very hard to obtain. We therefore stick with a medium that comes close to being a vacuum such as air filled empty space which has an index of refraction $n_3 \cong 1.0$. When we choose $n_1 = 1.50$, $n_2 = 1.47$, $n_3 = 1.00$ (for example, $n_1$ is the medium filled with liquid crystal, $n_2$ is the medium filled with $SiO_2$, and $n_3$ is the air filled medium), the particular incidence angle $\Omega_c$ for an incoming ray 50a would result in the critical angle $\theta_c$, which relation is given by Equation 6 from FIG. 25, $$n_0 \sin(\Omega_c) = n_1 \sin(\theta_1),$$

$$n_1 \sin(\theta_1) = n_2 \sin(\theta_c),$$

$$n_2 \sin(\theta_c) = n_3 \sin(\Omega_c),$$

$$n_3 \sin(\Omega_c) = n_2 \sin(\theta_c) \quad (6)$$

or, after simplifying, $$n_0 \sin(\Omega_c) = n_2 \sin(\theta_c) \quad (7)$$

Solving the above relation for $\Omega_c$, we obtain $$\Omega_c = \arcsin\left(\frac{n_2}{n_0} \sin(\theta_c)\right) \quad (8)$$

or with $n_0 = 1.00$ and $n_2 = 1.47$, where air for $n_0$ has been chosen, $$\Omega_c = \arcsin(1.47 \sin(\theta_c)) \quad (9)$$

Figure 25:
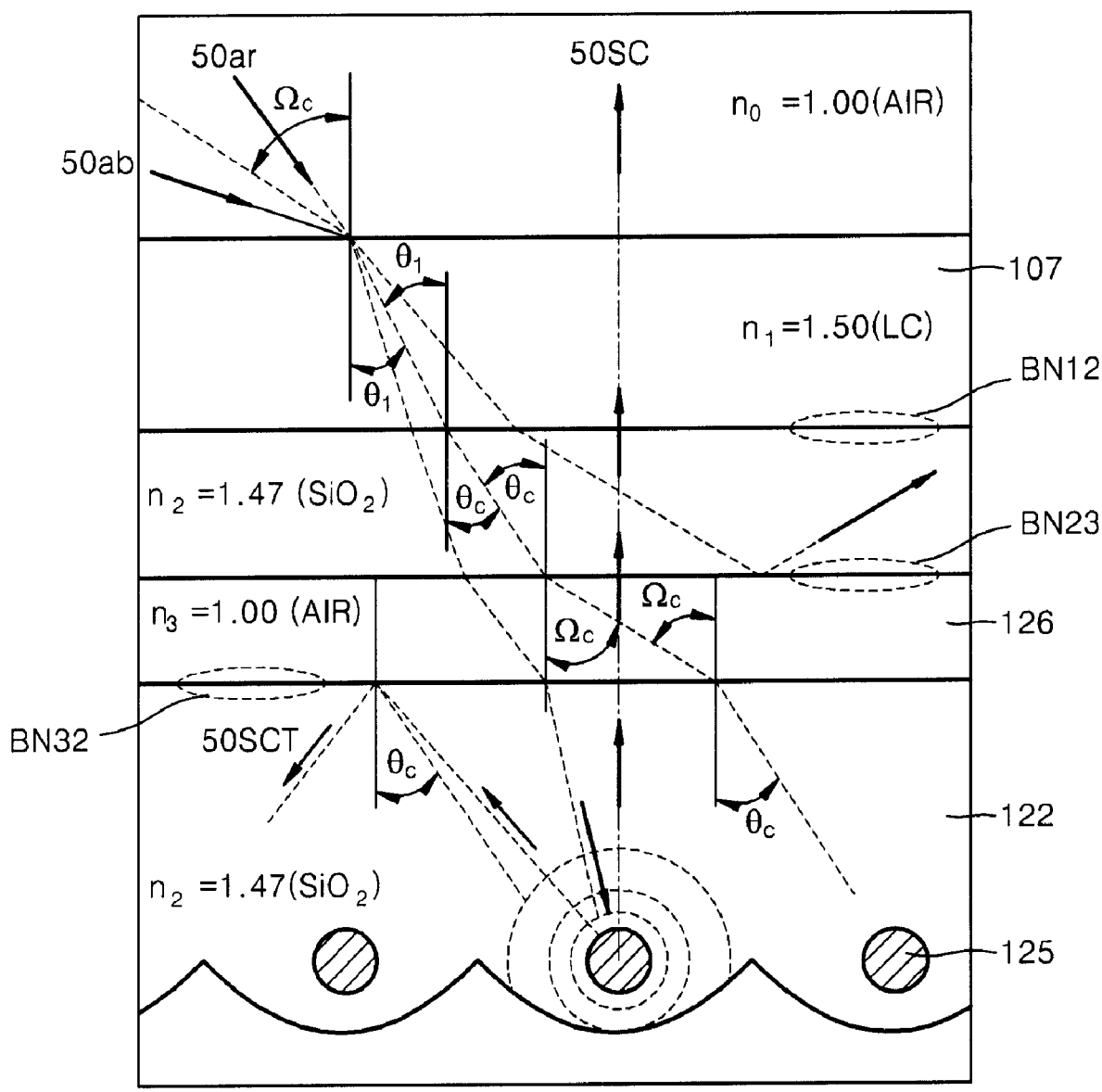
FIG. 25 is a schematic view used to determined critical angles $\Omega_c$ and $\theta_c$.

Referring to FIG. 25, the rays of an ambient light source of external environment impinging on the device (for example, the ray 50a of FIGS. 2 and 3), when passing through layers such as the one illustrated in FIG. 25, may go through total internal reflection at interfaces indicated by BN12 and BN23. If the critical angle of incidence which gives rise to total internal reflection at BN23 is $\Omega_c$, any ray with its angle of incidence $\Omega > \Omega_c$ would go through total internal reflection at the interface BN23. Since $(n_1 - n_2) < (n_2 - n_3)$, the occurrence of total internal reflection at BN12 proceeds that at BN23.

For $n_1 = 1.50$ and $n_2 = 1.47$, the total internal reflection at interface BN12 may occur when $$\theta_1 \geq \arcsin\left(\frac{n_2}{n_1}\right) \quad (10)$$

$$= \arcsin\left(\frac{1.47}{1.50}\right)$$

$$\cong 1.37$$

or in degrees, $$\theta_1 \cong 78.52° \quad (11)$$

This implies that, for an incoming ray 50a to go through total internal reflection at interface BN12, it must have its angle of incidence $\Omega$, $$\Omega = \arcsin\left(\frac{n_1}{n_0} \sin(\theta_1)\right) \quad (12)$$

$$= \arcsin(1.50 \sin(1.37))$$

$$\cong 1.57 - i0.93$$

, where Ω becomes a complex number with the real part of 1.57 and the imaginary part of −0.93. The above result implies that Ω must be, in degrees, greater than 90°, which condition cannot be satisfied because Ω is bounded such that $0° \leq \Omega \leq 90°$. It can therefore be concluded that, for the special case where refractive index values are $n_1=1.50$ and $n_2=1.47$, the total internal reflection at the interface BN12 in FIG. 25 (i.e., the interface between the LC layer 107 and the third medium layer 127) never occurs, and the only possible interface for total internal reflection is at BN 23 (i.e., the interface between the third medium layer 127 and the second medium layer 126 formed of a vacuum or air gap).

At the interface BN23, with n2=1.47 and n3=1.00, the criteria for total internal reflection is given by $$\theta_c = \arcsin\left(\frac{n_3}{n_2}\right) \tag{13}$$
$$= \arcsin\left(\frac{1.00}{1.47}\right)$$
$$= 0.74813$$

or in degrees, $$\theta_c° = 42.87° \tag{14}$$

Using the value just found for $\theta_c$, the critical angle $\Omega c$ for the incoming ray 50a may be obtained by $$\Omega_c = \arcsin(1.47\sin(0.74813)) \tag{15}$$
$$= 1.5679$$

or in degrees, $$\Omega_c° = 89.84° \tag{16}$$

The result shown in Equation 16 implies that the incoming ray 50ar in FIG. 25, so long as its angle of incidence Ω in degrees is less than 89.84°, it would always reach the spherical scatterer without being total internally reflected at interface BN23. Only those incoming ray 50ab of an external source at an incident angle $\Omega \geq 89.84°$ would be total internally reflected at the interface BN23 and would not be able to result in induced radiation by a spherical scatterer.

Since the incidence angle Ω is bounded such that $0° \leq \Omega \leq 90°$, and considering the fact that the incidence angle of an external light ray which does not reach the spherical scatterer is $\Omega \geq 89.84°$, most of the incoming rays for the external light source do reach the spherical scatterer 125 of FIG. 25 and induces radiation. Some of the induced rays would belong to the region defined by 90-δ° of FIG. 24 and others with the region defined by δ° of FIG. 24. In the illustration shown in FIG. 25, the induced ray 50SCT which has its incidence angle greater than $\theta_c° = 42.87°$ would be total internally reflected at the interface BN32. This total internally reflected 50SCT would then proceed to the neighboring spherical scatterer 125. Further large induced light rays such as 50SC (see FIG. 25) which belongs to the region defined by δ° of FIG. 22 would be produced, thereby increasing the performance of directed reflectance.

Having presented briefly the working principle behind the enhancement of the performance in directed reflectance via total internal reflection, implementation of the present invention is briefly discussed. In order to make the critical angle $\theta_c$ for the onset of total internal reflection as small as possible, the layer $n_3$ of illustration shown in FIG. 24 is chosen to be that of empty space, possibly containing small amount of air. If one wishes to create a void (or an air gap) between any two sandwiching layers (e.g., one layer at the bottom and another layer at the top side of air gap or void), spacers 128 must be introduce in the void (or the air gap).

The spacers 128 are placed in the void (or air gap) to support top layers. There can be any number of spacers 128 placed in the void (or air gap) and spacers may be made of any material. For the simulation, however, there is chosen aluminum for the spacers 128 out of convenience.

For simplicity, there is terminated a reflective structure after three units, where a unit here is that of a parabolical concave with a spherical scatterer at its focus. In order to prevent any total internally reflected rays from escaping at the two terminating ends, each end has been blocked with the reflective blocks 124, as illustrated in FIG. 2. The purpose of the reflective blocks 124 is to reflect rays back into the system so as to make them go through another round of total internal reflections. The proper choice of materials for a reflective block those with high reflectivity such as aluminum, silver, etc.

In summary, the main idea behind the present invention is to recycle any reflected rays scattered in the direction identified with 90-δ° in FIG. 22. The recycling is done via total internal reflection through the introduction of layers such as the ones illustrated in FIGS. 24, 25, 2, and 14. This performance enhancement of directed reflectance via total internal reflection is not limited to the case where a parabolical concave has a spherical center at a focus.

This enhancement technique, i.e., enhancement via total internal reflection, can be applied to simple parabolical concaves without spherical scatters and there would result in appropriate performance enhancement of directed reflectance. The idea is that some of the rays will continuously go through total internal reflection and amongst these rays, there will be a ray that finally satisfies the condition to escape through the direction identified with δ° in FIG. 22. Since it is by postulation that any ray scattering in the direction identified with δ° in FIG. 22 would be collected by the detector, it results in performance enhancement of directed reflectance. By the same token of arguments, the enhancement technique via total internal reflection can equally well be applied to the case of parabolical convex reflectors.

Figure 26:
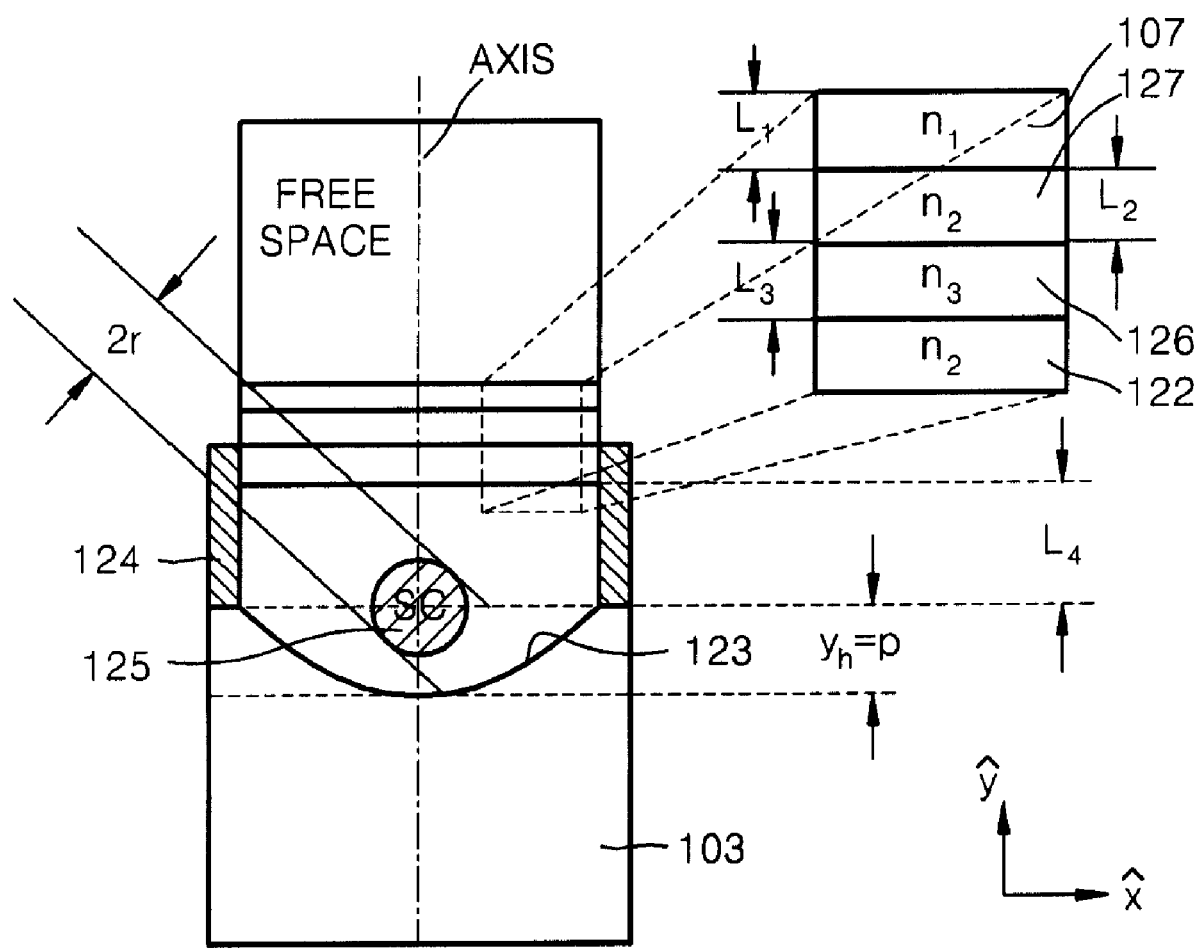
FIG. 26 schematically illustrates a sample device for finite difference time domain (FDTD) simulation.

There was performed finite difference time domain (FDTD) simulation for the quantitative analysis of the present invention. The FDTD calculation was done using the software from Lumerical Solutions, Inc. (Suite 660-789 West Pender Street, Vancouver, British Columbia, V6C1H2, Canada), and the sample device for FDTD simulation is shown in FIG. 26. In the sample device for FDTD simulation, a thin conducting layer 129 has been omitted as this layer is only necessary for making an LC layer 107 in contact with a TFT 115.

Aluminum has been chose for the reflecting surface 123, and the refractive index values for each layer have been given the following values: $n_1=1.50$, $n_2=1.47$, and $n_3=1.00$. An algorithm for refractive index is contained in the Lumerical FDTD software. The layer defined by a refractive index $n_1$ contains liquid crystals, and therefore, the value of $n_1=1.50$ may have been chosen. The layer defined by refractive index $n_2$ (the third medium layer 127 and the first medium layer 122) is that of $SiO_2$ and thus, the assigned value $n_2=1.47$. The layer defined with refractive index $n_3$ is that of empty space, which has the value for index of refraction $n_3=1.00$. In practice, it is very difficult to create truly empty space, but the presence of small amount particles, commonly given a term "air", do not alter the refractive index $n_3$ from unity. Therefore, empty space condition for layer defined by $n_3$ can perfectly contain to the case where it may possibly contain some air.

For the simulation, aluminum has been chosen for the two blocking reflecting blocks 124 at the ends. The radius of the spherical scatterer 125a (SC) was set at 250 nm, and the material chosen for it was that of aluminum. The height $y_h$ of a parabolical concave reflecting surface 123 was set at $y_h=p=2000$ nm, wherein p is the focal length. Equation for the cross-sectional view of a parabolical concave reflecting surface such as the one illustrated in FIG. 26 is given by $y=0.25x^2/p$. For thickness or depth of each layer marked by $L_1, L_2, L_3,$ and $L_4$ in FIG. 26, we have chosen for simplicity $L_1=709.68$ nm, $L_2=748.30$ nm, $L_3=1100$ nm, and $L_4=1122.45$ nm. It is remained that these values for $L_1, L_2, L_3,$ and $L_4$ have been chosen merely out of convenience and values for these can be changed for fine tuning. The type of wave source used was that of plane wave of free space having wavelength of 550 nm with unit amplitude. The polarization of the plane wave source has been set at TE (transverse electric) mode. In the calculation of scattered power for the far field, the detector has been assumed to be placed one meter away from the scatterer along the axis of a parabolical concave. For the half width δ of the detector illustrated in FIGS. 20 and 21, the value has been set in degrees to be δ=2.5°.

Figure 27:
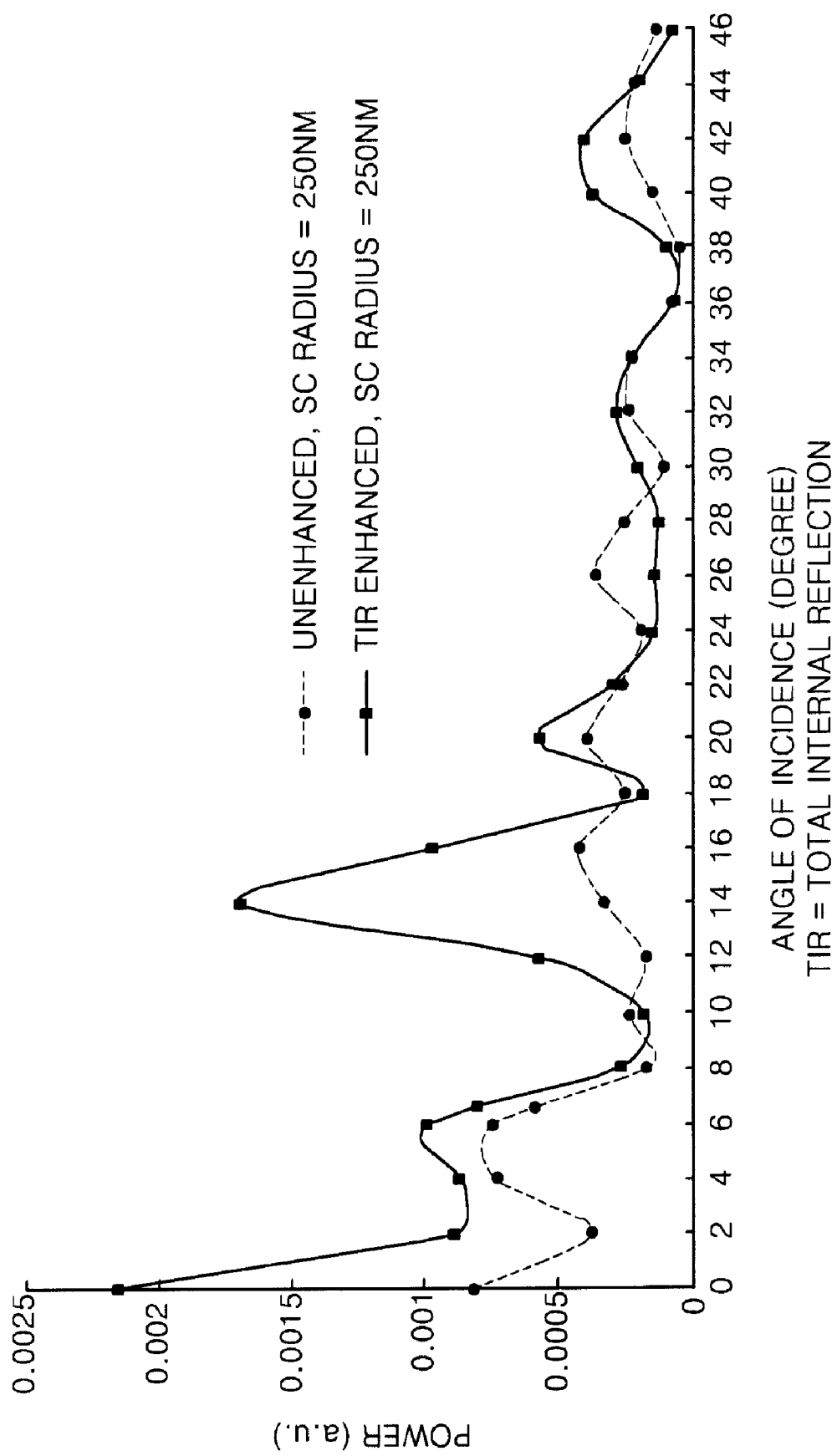
FIG. 27 illustrates scattering power collected by a detector of FIG. 20 with respect to the sample device of FIG. 26 and comparison example.
Figure 28:
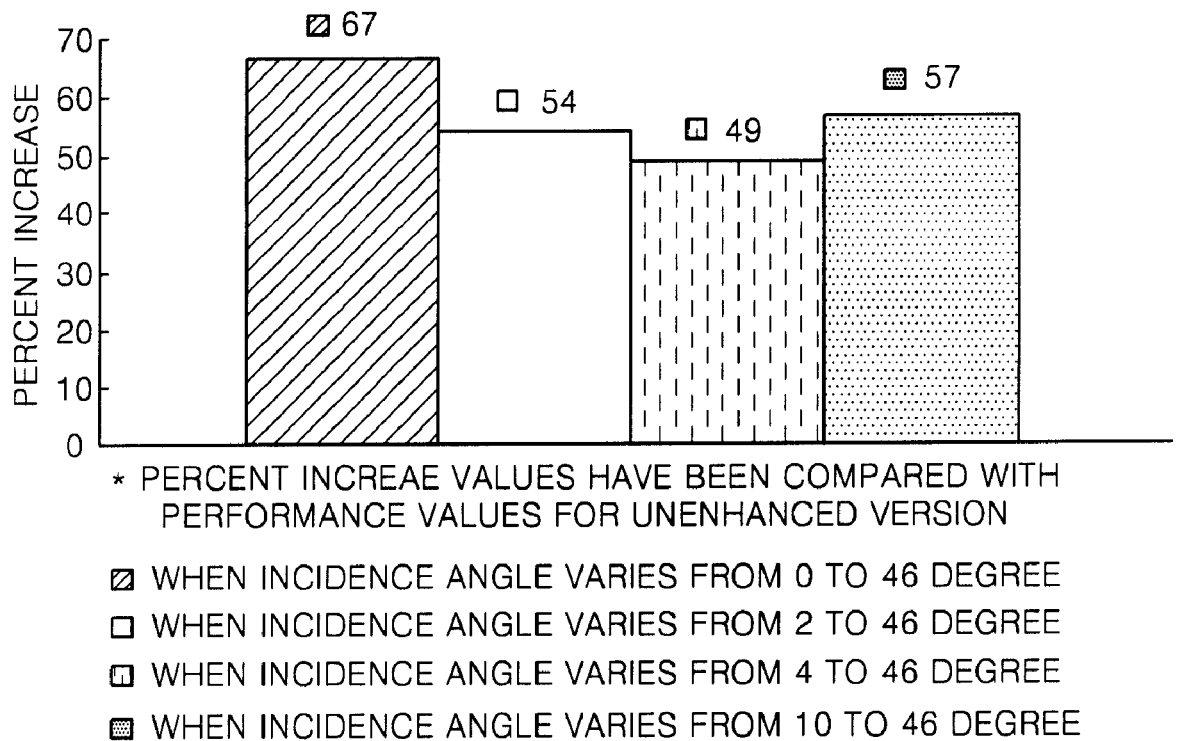
FIG. 28 illustrates the performance of the present invention with respect to the comparison example.

Illustrated in FIG. 27 is the scattered power collected by the detector placed one meter away from the scatterer along the y^ axis of the parabolical concave. In FIG. 27, the total internal reflection enhanced version is that of the result obtained by simulating the sample device shown in FIG. 26, and the unenhanced version is that of the result obtained by simulating the same apparatus with refractive index $n_3$ modified to $n_3=n_2=1.47$. In the unenhanced version, the enhancement contribution due to total internal reflection has been eliminated by filling the layer defined by refractive index $n_3$, which was initially an empty space, with $SiO_2$. Illustrated in FIG. 28 is the directed reflectance performance increase in percent of the total internal reflection enhanced version (present invention) over that of the unenhanced version (comparison example). As can be seen, by utilizing the enhancement via total internal reflection, the performance in the directed reflectance has been improved by as much as 67%, 54%, 49%, and 57% over that of the unenhanced version for the respective cases where the incidence angle Ω in degrees varied from 0° to 46°, 2° to 46°, 4° to 46°, and 10° to 46°.

As described above, in the LCD according to the present invention, by including a reflecting region having an array of a plurality of reflecting surfaces, which are formed so that at least a portion toward a front substrate of a side of a rear substrate side cannot be parallel to the front substrate, and a reflecting region having a stack structure, which is formed at the rear substrate so that a portion of light traveling toward the front substrate total internally reflects off, the ratio of the vertical component of light that is incident on the LC panel from the outside and reflects off the reflection region can be increased such that the ratio of rays that substantially contribute to illumination of an LC layer is increased.

Furthermore, concave reflecting curved surfaces are provided to the array of reflecting surfaces of the reflecting region, and a scatterer is further provided inside the concave reflecting curved surfaces, and induced radiation is used such that the ratio of rays that substantially contribute to illumination of an LC layer is increased.

Therefore, in the LCD according to the present invention, the performance of a contrast ratio can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An LCD (liquid crystal display) comprising:
   a rear substrate and a front substrate;
   an LC (liquid crystal) layer placed between the rear substrate and the front substrate; and
   a reflecting region which reflects external light in at least a portion of a region toward the LC layer at a side of the rear substrate to illuminate the LC layer; and
   the reflecting region comprises:
   a first medium layer having a first index of refraction and formed to have a flat surface;
   a second medium layer having a second index of refraction that is smaller than the first medium layer;
   a third medium layer having a third index of refraction that is larger than the second medium layer; and
   an array of a plurality of reflecting surfaces that is formed on a surface of the first medium layer that faces the rear substrate, wherein at least a portion of the plurality of reflecting surfaces are not parallel to the front substrate, and
   a portion of light that travels from the rear substrate at an interface between the first medium layer and the second medium layer is totally internally reflected.

2. The LCD of claim 1, wherein the reflecting surfaces are concave reflecting curved surfaces.

3. The LCD of claim 2, further comprising a scatterer placed inside the first medium layer so as to be separated from the concave reflecting surfaces and disposed between the concave reflecting surfaces and the front substrate, and the first medium layer fixes the scatterer with respect to the concave reflecting curved surfaces.

4. The LCD of claim 3, wherein a cross-section of the concave reflecting curved surfaces forms a parabola, and the scatterer is placed at a focus of the concave reflecting curved surfaces or near the focus.

5. The LCD of claim 3, wherein the scatterer is one selected from the group consisting of a single spherical scatterer, a core-shell structure spherical scatterer, and a scatterer having an effective spherical structure in which scattering particles form a cluster.

6. The LCD of claim 5, wherein the scattering particles are one of core-shell structure spherical scattering particles or spherical scattering particles.

7. The LCD of claim 5, wherein the scatterer is disposed to scatter a plurality of types of color light or particular single color light.

8. The LCD of claim 3, further comprising:
   a BLU (backlight unit) located at a back of the rear substrate so as to be disposed at an opposite side of the rear substrate from the front substate; and
   a transmissive region through which illumination light from the BLU passes toward the LC layer.

9. The LCD of claim 8, further comprising a color filter disposed between the reflecting region and the front substrate, wherein the scatterer is disposed to scatter a plurality of types of color light.

10. The LCD of claim 8, wherein the scatterer is disposed to scatter particular color light, the reflecting region serves as an effective color filter element for particular color light, and a color filter element for passing the same color light as the particular color light is further provided in a position corresponding to the transmissive region.

11. The LCD of claim 3, wherein the LCD is a reflective LCD.

12. The LCD of claim 11, further comprising a color filter disposed between the reflecting region and the front substrate, wherein the scatterer is disposed to scatter a plurality of types of color light.

13. The LCD of claim 11, wherein the scatterer is disposed to scatter particular color light, and the reflecting region serves as an effective color filter element for particular color light so that a color filter is not needed.

14. The LCD of claim 2, wherein a cross-section of the concave reflecting curved surfaces forms a parabola.

15. The LCD of claim 1, wherein the reflecting surfaces are convex reflecting curved surfaces.

16. The LCD of claim 15, wherein a cross-section of the convex reflecting curved surfaces forms a parabola.

17. The LCD of claim 1, wherein the LCD is a transreflective LCD further comprising:
    a BLU (backlight unit) located at a back of the rear substrate so as to be disposed at an opposite side of the rear substrate as the front substrate; and
    a transmissive region through which illumination light from the BLU passes toward the LC layer.

18. The LCD of claim 17, further comprising a color filter disposed on the front substrate.

19. The LCD of claim 1, further comprising a reflecting block which is disposed in a boundary pixel or a subpixel to prevent light totally internally reflected at an interface between the first and second medium layers from traveling to an adjacent pixel or subpixel, by reflection.

20. The LCD of claim 1, wherein the first and third medium layers are formed of a transparent dielectric material, and the second medium layer is formed of a vacuum or air gap.

21. The LCD of claim 20, wherein the array of reflecting surfaces is formed of metal.

22. The LCD of claim 20, further comprising spacers formed inside the second medium layer for supporting the third medium layer to be spaced apart from the first medium layer by a predetermined gap.

23. The LCD of claim 22, wherein the reflecting surfaces are regularly arranged to be spaced apart from one another so as not to contact one another, and the spacers are positioned in any one of an entire region between the reflecting surfaces, an entire region between partial reflecting surfaces, and a portion of a region between at least a portion of reflecting surfaces.

24. The LCD of claim 22, wherein the reflecting surfaces are irregularly arranged to contact and/or to be spaced apart from one another, and the spacers are positioned in any one of an entire region between the reflecting surfaces, an entire region between partial reflecting surfaces, and a portion of a region between at least a portion of reflecting surfaces.

* * * * *